United States Patent
Garg et al.

(10) Patent No.: US 8,754,991 B2
(45) Date of Patent: *Jun. 17, 2014

(54) SHARED MEMORY MULTI VIDEO CHANNEL DISPLAY APPARATUS AND METHODS

(75) Inventors: Sanjay Garg, Bangalore (IN); Bipasha Ghosh, Bangalore (IN); Nikhil Balram, Mountain View, CA (US); Kaip Sridhar, Bangalore (IN); Shilpi Sahu, Bangalore (IN); Richard Taylor, Phoenix, AZ (US); Gwyn Edwards, Mountain View, CA (US); Loren Tomasi, Chandler, AZ (US); Vipin Namboodiri, Bangalore (IN)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,196

(22) Filed: Sep. 14, 2012

(65) Prior Publication Data

US 2013/0010197 A1 Jan. 10, 2013

Related U.S. Application Data

(63) Continuation of application No. 11/736,561, filed on Apr. 17, 2007, now Pat. No. 8,284,322.

(60) Provisional application No. 60/793,288, filed on Apr. 18, 2006, provisional application No. 60/793,275, filed on Apr. 18, 2006, provisional application No. 60/793,276, filed on Apr. 18, 2006, provisional application No. 60/793,277, filed on Apr. 18, 2006.

(51) Int. Cl.
*H04N 9/64* (2006.01)

(52) U.S. Cl.
USPC .................................................. 348/714

(58) Field of Classification Search
USPC ......... 348/714, 725, 552–554, 448, 441, 607, 348/611, 614, 451
See application file for complete search history.

(56) References Cited

U.S. PATENT DOCUMENTS

| 4,777,531 A | 10/1988 | Hakamada et al. |
| 5,040,067 A | 8/1991 | Yamazaki |

(Continued)

FOREIGN PATENT DOCUMENTS

| EP | 0 851 677 | 7/1998 |
| EP | 1 534 008 | 5/2005 |

(Continued)

OTHER PUBLICATIONS

"10-Bit, Integrated, Multiformat SDTV/HDTV Video Decoder and RGB Graphics Digitizer ADV7401," Analog Devices, retrieved from the Internet at: http://www.analog.com/UploadedFiles/Data_Sheets/ADV7401.pdf, Nov. 2005.

(Continued)

*Primary Examiner* — Paulos M Natnael

(57) ABSTRACT

A shared memory video processor including signal processing circuitry. The signal processing circuitry may enable a noise reducer and a de-interlacer to share access to field buffers in a memory device to store various field lines. Some of the stored field lines may also be shared within the signal processing circuitry. The sharing of some stored field lines reduces overall memory bandwidth and capacity requirements. The signal processing circuitry may be capable of performing multiple field line processing. A set of field line buffers may be provided to store field lines for multiple field segments and may provide the data to the corresponding inputs of the signal processing circuitry. To further reduce storage, some of the field line buffers may also be shared among the signal processing circuitry.

20 Claims, 20 Drawing Sheets

(56) References Cited

U.S. PATENT DOCUMENTS

| | | | |
|---|---|---|---|
| 5,159,707 | A | 10/1992 | Mogi et al. |
| 5,313,660 | A | 5/1994 | Lindenmeier et al. |
| 5,400,083 | A | 3/1995 | Mizusawa |
| 5,636,361 | A | 6/1997 | Ingerman |
| 5,847,772 | A | 12/1998 | Wells |
| 5,912,710 | A | 6/1999 | Fujimoto |
| 5,982,360 | A | 11/1999 | Wu et al. |
| 5,982,453 | A | 11/1999 | Willis |
| 6,006,303 | A | 12/1999 | Barnaby et al. |
| 6,020,931 | A | 2/2000 | Bilbrey et al. |
| 6,037,981 | A | 3/2000 | Wilson et al. |
| 6,104,417 | A | 8/2000 | Nielsen et al. |
| 6,141,062 | A | 10/2000 | Hall et al. |
| 6,275,267 | B1 | 8/2001 | Kobayashi |
| 6,359,654 | B1 | 3/2002 | Glennon et al. |
| 6,456,340 | B1 | 9/2002 | Margulis |
| 6,563,506 | B1 | 5/2003 | Wang |
| 6,577,353 | B1 | 6/2003 | Welles et al. |
| 6,603,961 | B1 | 8/2003 | Kuroda |
| 6,674,796 | B1 | 1/2004 | Haskell et al. |
| 6,690,425 | B1 | 2/2004 | Worrell |
| 6,788,230 | B2 | 9/2004 | Ahn |
| 6,806,883 | B2 | 10/2004 | Lavelle et al. |
| 7,034,893 | B2 | 4/2006 | Liu et al. |
| 7,034,894 | B1 | 4/2006 | Kawamura |
| 7,176,982 | B2 | 2/2007 | Zhu et al. |
| 7,250,983 | B2 | 7/2007 | Lin et al. |
| 7,259,796 | B2 | 8/2007 | Sha et al. |
| 7,262,818 | B2 | 8/2007 | Chuang et al. |
| 7,277,686 | B2 | 10/2007 | Gierl et al. |
| 7,321,399 | B2 | 1/2008 | Rumreich |
| 7,324,160 | B2 | 1/2008 | Yang |
| 7,365,801 | B2 | 4/2008 | Kondo |
| 7,366,816 | B2 | 4/2008 | Rai |
| 7,400,359 | B1 | 7/2008 | Adams |
| 7,426,594 | B1 | 9/2008 | Riach et al. |
| 7,477,326 | B2 | 1/2009 | Jaffe |
| 7,480,012 | B1 | 1/2009 | Greenberg |
| 7,518,659 | B2 | 4/2009 | Iizuka et al. |
| 7,525,600 | B2 | 4/2009 | Kaylani et al. |
| 7,609,768 | B2 | 10/2009 | Chung |
| 7,692,683 | B2 | 4/2010 | Kenoyer et al. |
| 7,769,089 | B1 * | 8/2010 | Chou ................. 375/240.29 |
| 7,797,610 | B1 | 9/2010 | Simkins |
| 7,821,578 | B2 * | 10/2010 | Pathak et al. ............. 348/607 |
| 7,848,430 | B2 * | 12/2010 | Valmiki et al. .......... 375/240.24 |
| 7,864,866 | B2 | 1/2011 | Jang et al. |
| 7,920,151 | B2 | 4/2011 | MacInnis et al. |
| 8,218,091 | B2 | 7/2012 | Garg et al. |
| 8,264,610 | B2 | 9/2012 | Garg et al. |
| 8,284,322 | B2 * | 10/2012 | Garg et al. ................ 348/714 |
| 8,537,838 | B2 | 9/2013 | Patel et al. |
| 2004/0131276 | A1 | 7/2004 | Hudson |
| 2004/0233334 | A1 | 11/2004 | Zhu et al. |
| 2005/0110902 | A1 | 5/2005 | Yang |
| 2005/0117654 | A1 | 6/2005 | Im |
| 2006/0077213 | A1 | 4/2006 | Li |
| 2006/0170825 | A1 | 8/2006 | Haider et al. |
| 2007/0159530 | A1 | 7/2007 | Park |
| 2008/0055477 | A1 | 3/2008 | Wu et al. |
| 2008/0151108 | A1 | 6/2008 | Doswald |
| 2008/0192146 | A1 * | 8/2008 | Yamana et al. ............. 348/607 |
| 2009/0010616 | A1 | 1/2009 | Tichelaar |

FOREIGN PATENT DOCUMENTS

| | | |
|---|---|---|
| JP | 63-131788 | 6/1988 |
| JP | 2000-092469 | 3/2000 |
| JP | 2000-270301 | 9/2000 |
| JP | 2004-045884 | 2/2004 |
| WO | WO 97/04401 | 2/1997 |
| WO | WO 03/045055 | 5/2003 |
| WO | WO 2004/057529 | 7/2004 |
| WO | WO 2006/000977 | 1/2006 |

OTHER PUBLICATIONS

"CX25836/7 Video decoder," Conexant, retrieved from the Internet at: http://conexant.com/servlets/DownloadServlet/DSH-200685-001.pdf?docid=686&revid=1, Sep. 2004.

"Get a Grip on Claims, Bias and AC-Coupled Video Signals," Maxim, retrieved from the Internet at: http://pdfserv.maxim-ic.com/en/an/AN3303.pdf, Aug. 6, 2004.

"Nexperia PNX1700 Connected Media Processor," Philips, Mar. 2005.

"PNX17xx Series Data Book," Philips, retrieved from the Internet at: http://www.nxp.com/acrobat_download/datasheets/PNX17XX_SER_N_1.pdf, Mar. 17, 2006.

"SAA7114 PAL/NTSC/SECAM video decoder with adaptive PAL/NTSC comb filter, VBI data slicer and high performance scaler," Philips, retrieved from the Internet at: http://www.nxp.com/acrobat_download/datasheets/SAA7114_3.pdf, Jan. 17, 2006.

Extended European Search Report for EP 11002324 dated Jul. 8, 2011.

Guttag, K. et al., A Single-Chip Multiprocessor for Multimedia: The MVP, IEE Computer Graphics and Applications, IEEE Service Center, New York, NY, vol. 12, No. 6, Nov. 1992, pp. 53-64.

Hunt, R, "The Reproduction of Colour", 1975, Fountain Press, England, p. 466-469.

* cited by examiner

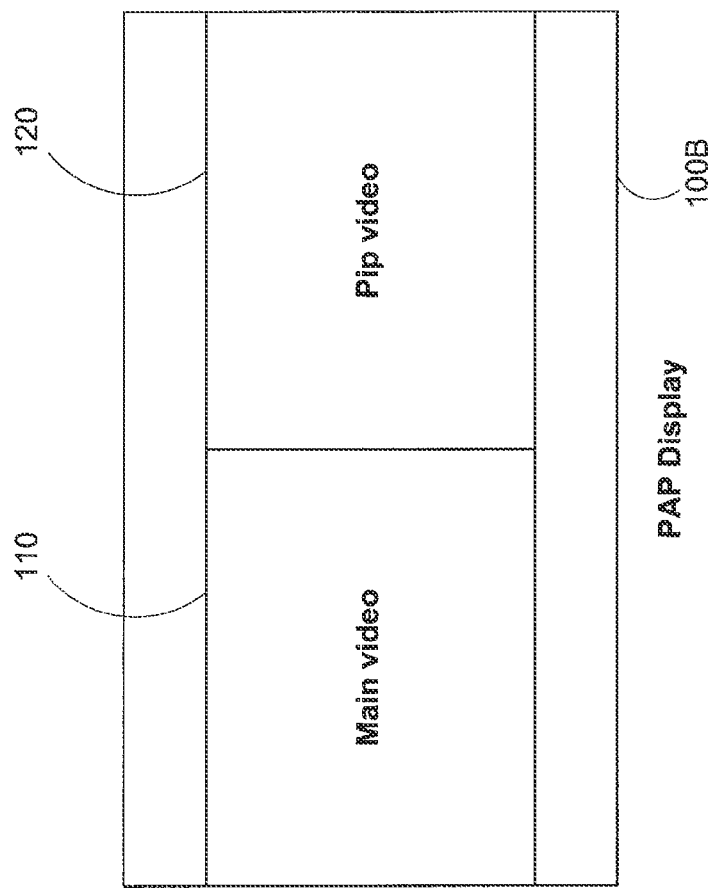
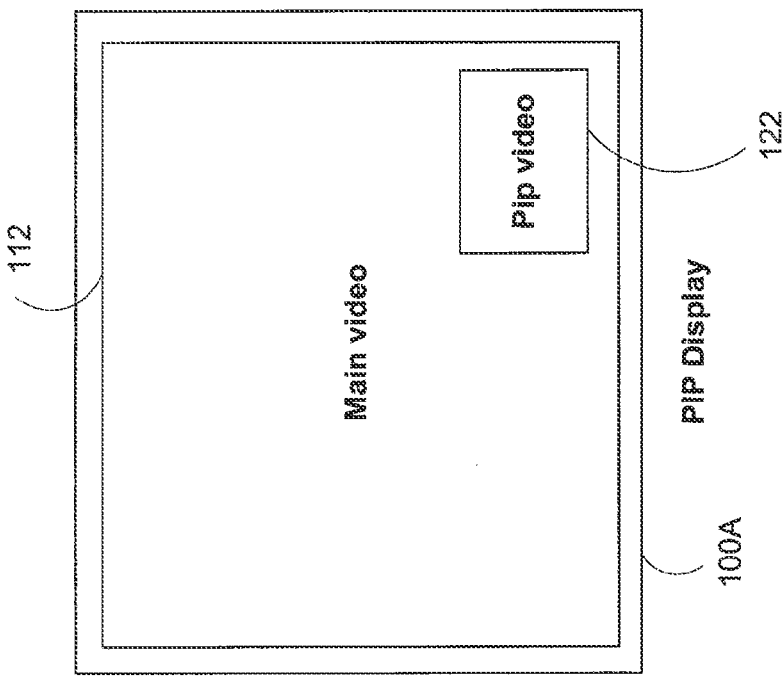
FIG. 1A
FIG. 1B
FIG. 1

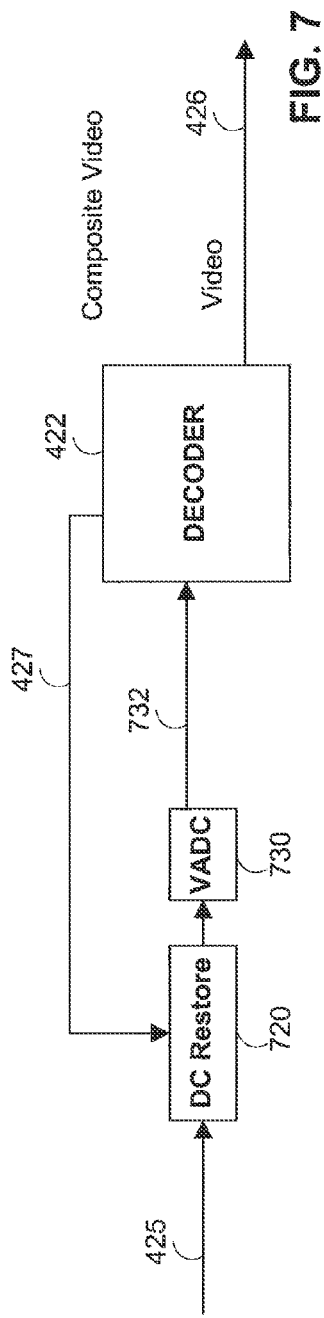
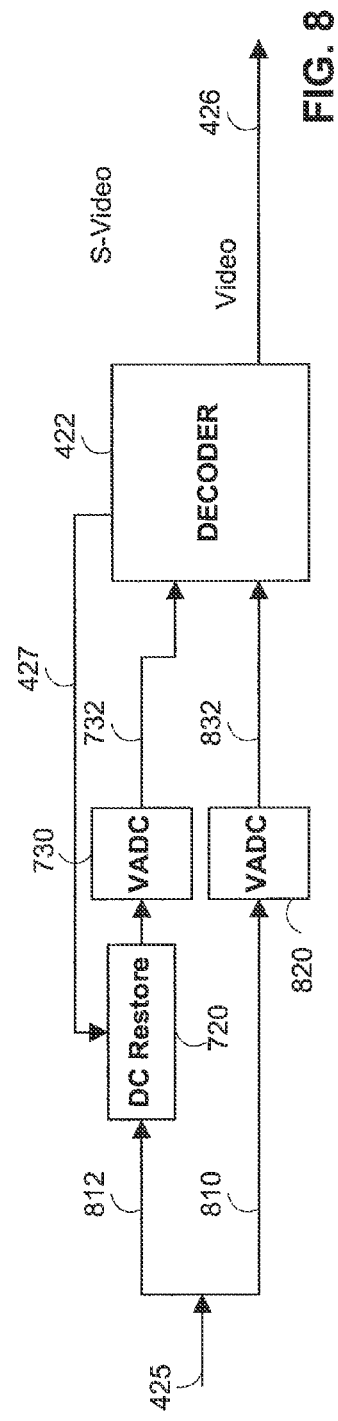
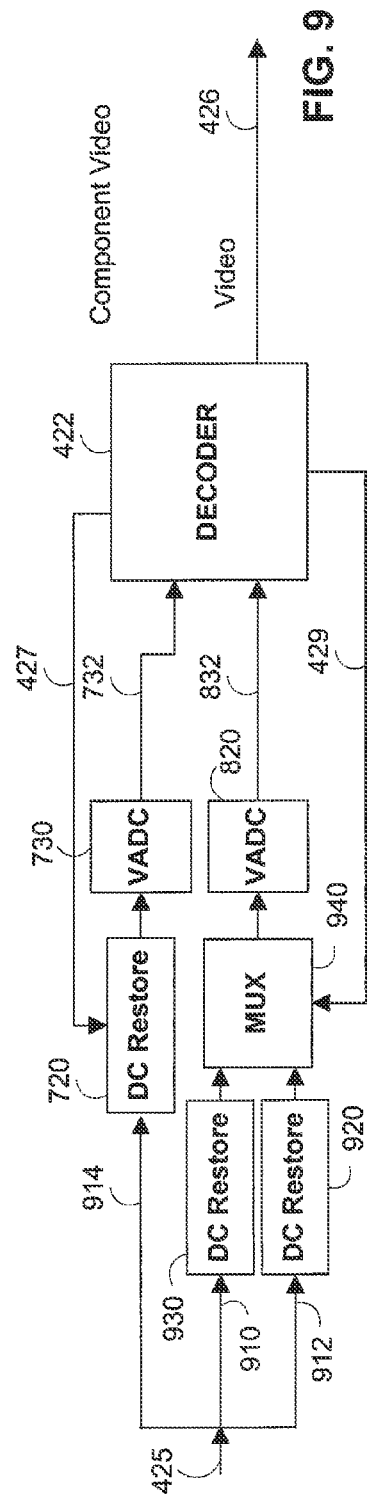
FIG. 7
FIG. 8
FIG. 9

SHARED MEMORY MULTI VIDEO CHANNEL DISPLAY APPARATUS AND METHODS

CROSS REFERENCE TO RELATED APPLICATION

This application is a continuation of U.S. patent application Ser. No. 11/736,561, filed Apr. 17, 2007, (currently pending), which claims the benefit of U.S. Provisional Applications Nos. 60/793,288, filed Apr. 18, 2006, 60/793,276, filed Apr. 18, 2006, 60/793,277, filed Apr. 18, 2006, and 60/793,275, filed Apr. 18, 2006 each disclosure of which is hereby incorporated by reference herein in its entirety.

BACKGROUND OF THE INVENTION

Traditionally, multi video channel television display screens are equipped with dual channel video processing chips which enable a user to view one or more channels simultaneously on various portions of the display screen. This form of displaying a picture within a picture is commonly referred to as picture-in-picture or PIP. FIG. 1A is an example of displaying two channels on various portions of the display screen having an aspect ratio of 4:3. A screen 100A displays a first channel 112 on the majority portion of the screen simultaneously with a second channel 122 that is displayed on a substantially smaller portion of the screen. FIG. 1B is an example of a display having a first channel and a second channel with substantially the same aspect ratio on different portions of the screen and will be described in more detail below.

A typical television system for generating PIP display 100A is shown in FIG. 2. Television display system 200 includes, television broadcast signals 202, a hybrid TV tuner 210, baseband inputs 280, a demodulator 220, an MPEG Codec 230, an off-chip storage 240, an off-chip memory 300, video processor 250, and an external component 270 (e.g., a display). Hybrid TV tuner 210 can tune to one or more television channels provided by television broadcast signals 202. Hybrid TV tuner 210 may provide digital television signals to demodulator 220 and analog video signal components (e.g., Composite Video Baseband Signals (CVBS)) to video processor 250. Additionally, baseband inputs 280 may receive various television signals (e.g., CVBS, S-Video, Component, etc.) and provide them to video processor 250. Other external digital or analog signals (e.g., DVI or High Definition (HD)) may also be provided to video processor 250.

The video is demodulated by demodulator 220 and is then decompressed by MPEG Codec 230. Some operations required by MPEG Codec 230 may use off-chip storage 240 to store data. The digital signal(s) are then processed by video processor 250, which can be a dual channel processing chip, in order to generate the proper signals 260 for display on external component 270. Video processor 250 may use off-chip memory 300 to perform memory intensive video processing operations such as noise reducing and de-interlacing; 3D YC separation and frame rate conversion (FRC).

In these PIP applications, it is generally perceived that first channel 112 is more important than second channel 122. Typical dual channel processing chips that are used to generate PIP place more quality emphasis on the first channel video pipe, which generates the large display of first channel 112. The second channel video pipe, which generates the smaller display of second channel 122 is of lesser quality in order to reduce costs. For example, 3-D video processing operations, such as de-interlacing, noise reduction, and video decoding, may be implemented on the first channel video pipe while implementing only 2-D video processing operations on the second channel video pipe. 3-D video processing operations refer to operations that process video in the spatial and temporal domains, often buffering one or more frames of video used in the processing operations. In contrast, 2-D video processing operations only process video in the spatial domains, operating only on the current frame of video.

With the advent of wide display screens having an aspect ratio of 16:9, displaying two channels having the same size or an aspect ratio of 4:3 on the same screen has become increasingly higher in demand. This form of application is commonly referred to as picture-and-picture (PAP). In FIG. 1B screen 100B displays a first channel 110 and a second channel 120 having substantially the same aspect ratio is displayed on a second portion of the screen. In these applications the first channel should be generated with similar quality as the second channel.

An implementation of 3-D video processing on both the first and second video channel pipes is therefore needed to produce two high-quality video images. Performing 3-D video processing to produce the desired display generally requires memory intensive operations that have to be performed within a time frame suitable to display the images without loss in quality or integrity. The memory operations increase proportionally with the number of channels that require 3-D video processing. Typical dual video processing chips lack ability to process two video signals with high-quality and are therefore becoming obsolete with the increase in demand to display two channels having high video quality.

One reason that typical dual video processing chips lack in the ability to process multiple high-quality video signals, is the large amount of data bandwidth required between the video processor and the off-chip memory. Traditionally, a portion of the video processing chip pipeline includes a noise reducer and de-interlacer each requiring high data bandwidth with the off-chip memory.

In particular, the noise reducer works primarily by comparing one field to the next field and removing portions of the field that are not the same in each field. For this reason, the noise reducer requires storage of at least two fields for comparison with a current field. The de-interlacer reads the two fields that were stored and combines them, thereby reversing the operations of the interlacer.

FIG. 3 illustrates the off-chip memory access operations of the noise reducer and de-interlacer of a typical video processor. A portion of the video processing pipeline includes a noise reducer 330, a de-interlacer 340, and off-chip memory 300, which contains at least four field buffer sections 310, 311, 312, and 313.

During a first field interval, noise reducer 330 reads a field buffer section 310 compares it to a video signal 320, produces a new field with reduced noise and writes this field output 322 to two field buffer sections 311 and 312. The contents that were previously stored in field buffer sections 311 and 312 are copied over to field buffer sections 310 and 313, respectively. Thus, at the end of the field interval, field output 322 of noise reducer 330 is stored in field buffer sections 311 and 312 and the fields previously stored in field buffer sections 311 and 312 are now in field buffer sections 310 and 313, respectively.

During the following field interval, field buffer section 312 containing the field output from noise reducer 330 from the previous field interval is read by de-interlacer 340, field buffer section 313 containing the field output from noise reducer 330 from the field interval previous to this field interval that was stored in field buffer section 312 is read by de-interlacer 340. Field output 322 of noise reducer 330 of the current field interval is also read by de-interlacer 340. De-interlacer 340 processes these field segments and combines them to provide a de-interlaced output 342 to the next module in the video pipeline.

The exemplary aforementioned video pipeline portions perform these operations for a single channel and its operations would be multiplied for each additional channel. Therefore, since memory access bandwidth increases proportionally with the amount of data that has to be written/read in the same interval, performing noise reduction and de-interlacing on multiple channels would increase the data bandwidth in the same manner. The incredible bandwidth demand of the above video processing operations limit the ability to perform these operations simultaneously.

Therefore, it would be desirable to have systems and methods for reducing memory access bandwidth in various sections of one or more video pipeline stages of one or more channels in order to produce a display having multiple high-quality video channel streams.

SUMMARY OF THE INVENTION

In accordance with the principles of the present invention systems and methods are provided for reducing memory access bandwidth in various sections of one or more video pipeline stages of one or more channels in order to produce a display having multiple high quality video channel streams.

Systems and methods are provided for sharing memory in a video processing system. Previously stored contents of a first field buffer may be moved to a second field buffer. A first noise reduced live field may be stored in the first field buffer. Previously stored contents of the second field buffer may be provided to a noise reducer and a de-interlacer. The previously stored contents of the first field buffer may be provided to the de-interlacer.

In accordance with the principles of the present invention, methods and apparatus are provided for reducing memory access bandwidth in various sections of one or more video pipeline stages of one or more channels in order to produce a display having multiple high-quality video channel streams. A dual video processor may receive one or more analog or digital signals which may be in different formats. A dual video decoder (e.g., NTSC/PAL/SECAM video decoder) capable of decoding two simultaneous video signals in one or more video modes may be provided. In one of the video modes, the dual video decoder may perform time multiplexing to share at least one component such as an analog to digital converter, used in decoding the video signals.

The outputs of the video decoder, or another set of video signals provided by another component in the system, may be provided to signal processing circuitry (e.g., a noise reducer and/or a de-interlacer). The signal processing circuitry may access a memory device to store various field lines. Some of the stored field lines, that may be needed by the signal processing circuitry, may be shared. The sharing of some stored field lines reduces overall memory bandwidth and capacity requirements. The signal processing circuitry may be capable of performing multiple field line processing. A set of field line buffers may be provided to store field lines for multiple field segments and may provide the data to the corresponding inputs of the signal processing circuitry. To further reduce storage, some of the field line buffers may also be shared among the signal processing circuitry.

The outputs of the video decoder, or another set of video signals provided by another component in the system, may be provided to one or more scalers for producing differently scaled video signals. The scaler may be configured to be placed in various slots before the memory, after the memory, or if no memory access is desired either before or after (i.e., between the memory). If a video signal is to be up-scaled, the scaler may be placed after the memory in order to reduce the amount of data that is stored to the memory. If a video signal is to be downscaled, the scaler may be placed before the memory in order to reduce the amount of data that is stored to the memory. Alternatively, one scaler may be configured to be placed before the memory while another scaler may be configured to be placed after the memory thereby providing two video signals that are scaled differently (i.e., one may be up-scaled while the other may be downscaled) while reducing the amount of memory storage and bandwidth.

The outputs of the video decoder, or another set of video signals provided by another component in the system, may be provided to one or more frame rate conversion units. A blank time optimizer (BTO) may receive data pertaining to a field line of a frame of a video signal at a first clock rate. The BTO may determine the maximum amount of time available before the next field line of the frame is received. Based on this determination the BTO may send or receive the field line of the frame to memory at a second clock rate. The second clock rate used for the memory access may be substantially slower than the first, thereby reducing memory bandwidth and enabling another video signal that may have a shorter amount of available time between field lines to access memory faster. In turn, the BTO essentially distributes memory access from several memory clients (i.e., units requiring memory access) in a way that promotes efficient use of the memory bandwidth.

The video signal outputs of the BTO or another set of video signals provided by another component in the system, may be provided to an overlay engine for further processing. In the overlay engine, two or more video signals may be overlaid and provided to a color management unit (CMU). The CMU may receive the overlaid video signal and may process the overlaid video signal in portions. Upon receiving an indication that a portion of the overlaid video signal corresponds to a first video signal, the CMU may process the video signal portion using parameters that correspond to the first video signal portion and provide an output. Alternatively, upon receiving an indication that a portion of the overlaid video signal corresponds to a second video signal, the CMU may process the video signal portion using parameters that correspond to the second video signal portion and provide an output. A multi-plane (M-plane) overlay circuit in the overlay engine may receive two or more video signals, where one of these signals may be provided by the CMU, and provide an overlaid signal. The video signals may include a priority designator, and the overlay circuitry may then overlay the signals based on the priority designator.

The output of the overlay engine or another set of video signals provided by another component in the system which may be progressive, may be provided to a primary and/or auxiliary output stage. Alternatively, video signals may bypass the overlay engine and be provided to a primary and/or auxiliary output stage. In the primary and/or auxiliary output stages the video signals may undergo format conversion or processing to meet the requirements of a primary and/or auxiliary device such as, for example a display device and a recording device.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIGS. 1A and 1B is exemplary illustration of two channels being displayed on various portions of the same screen;

FIGS. 7-9 are illustrations of three modes of generating video signals in accordance with principles of the present invention;

DETAILED DESCRIPTION OF THE INVENTION

The invention relates to methods and apparatus for reducing memory access bandwidth and sharing memory and other processing resources in various sections of multiple video pipeline stages of one or more channels in order to produce one or more high-quality output signals.

Figure 2:
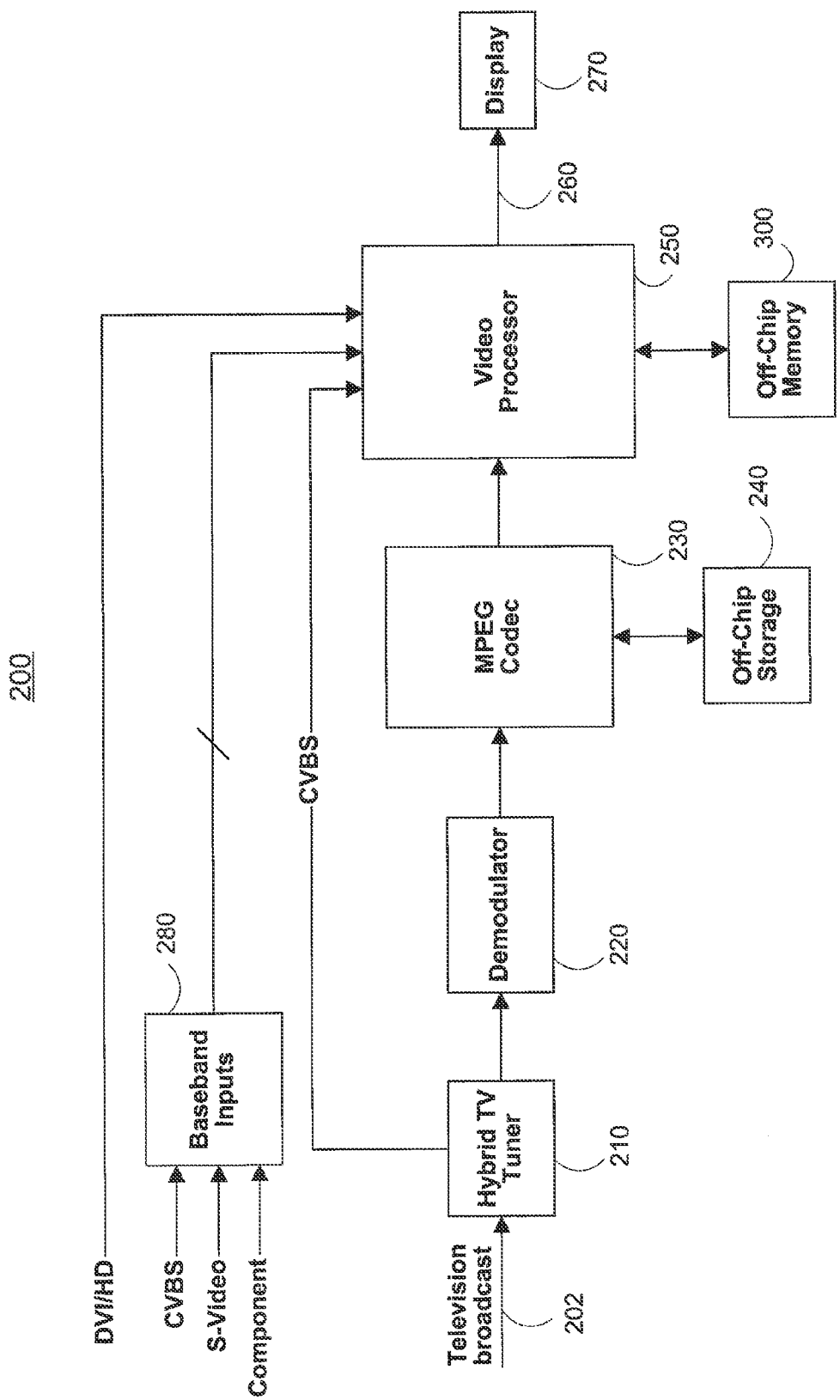
FIG. 2 is an illustration of generating PIP display.
Figure 4:
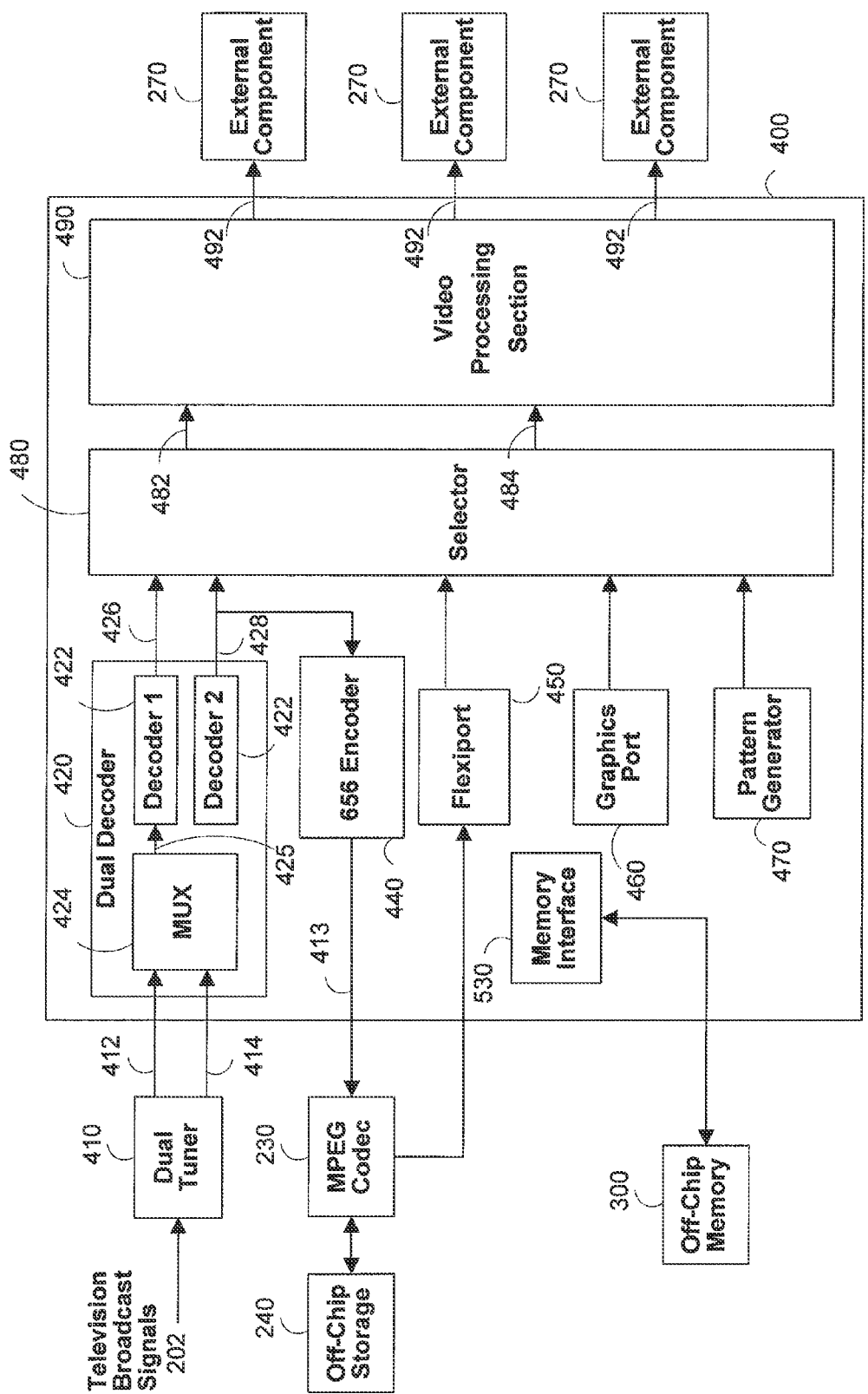
FIG. 4 is an illustration of a television display system in accordance with principles of the present invention.

FIG. 4 illustrates a television display system in accordance with the principles of the present invention. The television display system depicted in FIG. 4 may include, television broadcast signals 202, a dual tuner 410, MPEG Codec 230, off-chip storage 240, off-chip memory 300, a dual video processor 400, a memory interface 530 and at least one external component 270. Dual tuner 410 may receive television broadcast signals 202 and produce a first video signal 412 and a second video signal 414. Video signals 412 and 414 may then be provided to a dual decoder 420. Dual decoder 420 is shown to be internal to dual video processor 400, but may alternatively be external to video processor 400. Dual decoder 420 may perform similar functions as decoder 220 (FIG. 2) on first and second video signals 412 and 414. Dual decoder 420 may include at least a multiplexor 424 and two decoders 422. In alternative arrangements, multiplexor 424 and one or two of decoders 422 may be external to dual decoder 420. Decoders 422 provide decoded video signal outputs 426 and 428. It should be understood that decoders 422 may be any NTSC/PAL/SECAM decoders different from MPEG decoders. The inputs to decoders 422 may be digital CVBS, S-Video or Component video signals and the output of decoders 422 may be digital standard definition such as Y—Cb—Cr data signals. A more detailed discussion of the operation of dual decoder 420 is provided in connection with FIGS. 7, 8, 9, and 10.

Multiplexor 424 may be used to select at least one of two video signals 412 and 414 or any number of input video signals. The at least one selected video signal 425 is then provided to decoder 422. The at least one selected video signal 425 appears in the figure as a single video signal to avoid overcrowding the drawing, however, it should be understood the video signal 425 may represent any number of video signals that may be provided to the inputs of any number of decoders 422. For example, multiplexor 424 may receive 5 input video signals and may provide two of the 5 input video signals to two different decoders 422.

The particular video signal processing arrangement shown in FIG. 4 may enable the internal dual decoder 420 on dual video processor 400 to be used thereby reducing the cost of using an external decoder which may be required in the time-shifting applications. For example, one of the outputs 426 and 428 of dual decoder 420 may be provided to a 656 encoder 440 to properly encode the video signal to standard format prior to interlacing the video signals. 656 encoder 440 may be used to reduce the data size for processing at a faster clock frequency. For example, in some embodiments, 656 encoder 440 may reduce 16-bits of data, h-sync and v-sync signals to 8-bits for processing at double the frequency. This may be the standard to interface between SD video and any NTSC/PAL/SECAM decoders and MPEG encoders. The encoded video signal 413 may then be provided to an external MPEG Codec 230, for example, via a port on the video processor, to generate a time shifted video signal. Another port, flexiport 450 on dual video processor 400 may be used to receive the time shifted video signal from MPEG Codec 230. This may be desirable to reduce the complexity of the video processor by processing portions of digital video signals outside of the video processor. Moreover, time-shifting performed by MPEG Codec 230 may require operations that include compression, decompression and interfacing with non-volatile mass storage devices all of which may be beyond the scope of the video processor.

Other video signals such as a cursor, an on-screen display, or various other forms of displays other than broadcast video signals 202 that may be used in at least one external component 270 or otherwise provided to an external component, may also be generated using dual video processor 400. For example, dual video processor 400 may include a graphics port 460 or pattern generator 470 for this purpose.

The decoded video signals, as well as various other video signals, graphics generator 460, or pattern generator 470, may be provided to selector 480. Selector 480 selects at least one of these video signals and provides the selected signal to onboard video processing section 490. Video signals 482 and 484 are two illustrative signals that may be provided by selector 480 to onboard video processing section 490.

Onboard video processing section 490 may perform any suitable video processing functions, such as de-interlacing, scaling, frame rate conversion, and channel blending and color management. Any processing resource in dual video processor 400 may send data to and receive data from off-chip memory 300 (which may be SDRAM, RAMBUS, or any other type of volatile storage) via memory interface 530. Each of these function will be described in more detail in connection with the description of FIG. 5.

Finally, dual video processor 400 outputs one or more video output signals 492. Video output signals 492 may be provided to one or more external components 270 for display, storage, further processing, or any other suitable use. For example, one video output signal 492 may be a primary output signal that supports high-definition TV (HDTV) resolutions, while a second video output signal 492 may be auxiliary output that supports standard definition TV (SDTV) resolutions. The primary output signal may be used to drive a high-end external component 270, such as a digital TV or a projector at the same time as the auxiliary output is used for a standard definition (DVD) video recorder, a standard-definition TV (SDTV), a standard-definition preview display, or any other suitable video application. In this way, the auxiliary output signal may enable a user to record an HDTV program on any suitable SDTV medium (e.g., a DVD) while allowing the user to simultaneously view the program on an HDTV display.

Figure 5:
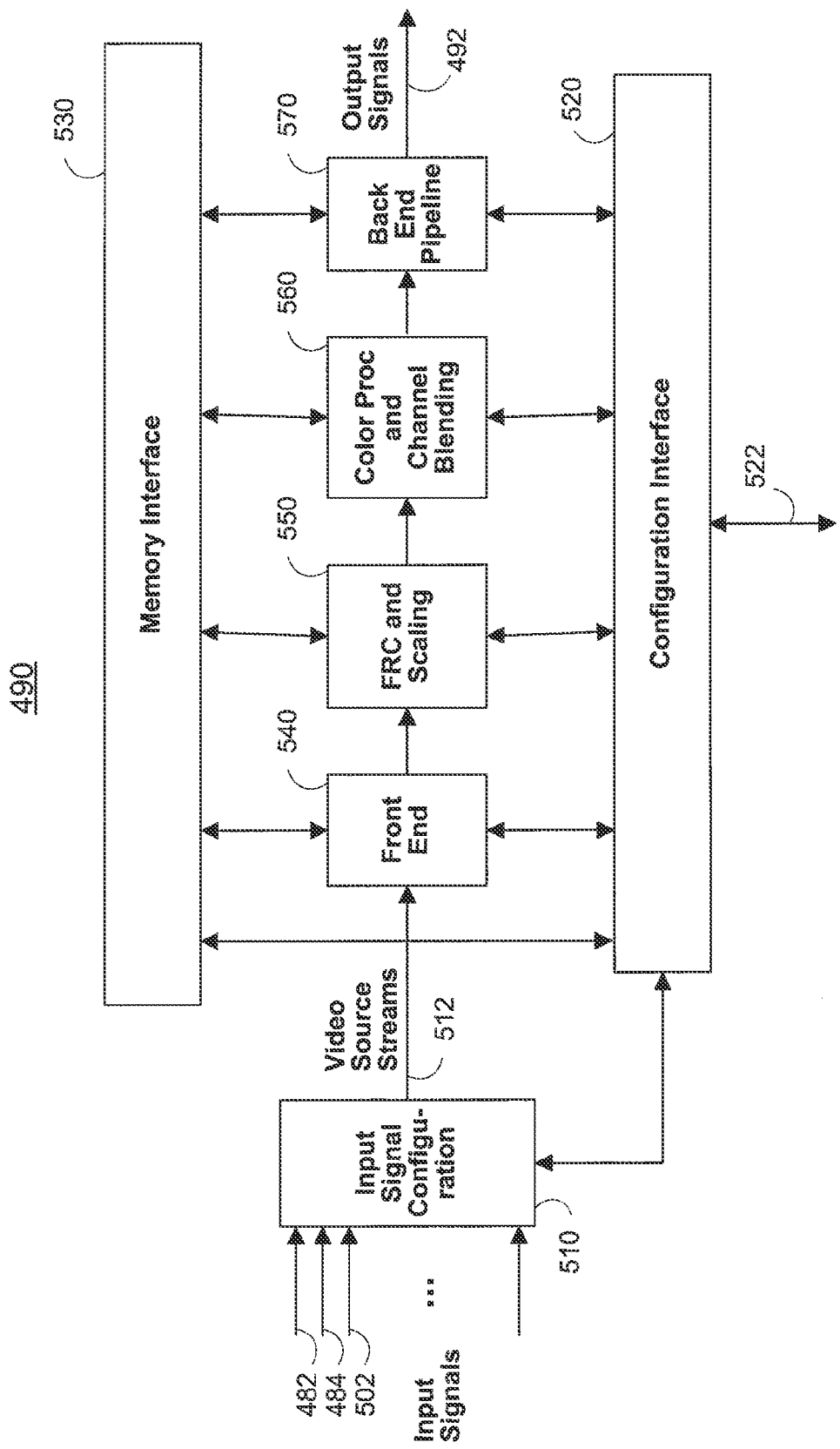
FIG. 5 is a detailed illustration of the functions of an onboard video processing section of a dual video processor in accordance with principles of the present invention.

FIG. 5 illustrates the functions of onboard video processing section 490 of dual video processor 400 in greater detail. Onboard video processing section 490 may include an input signal configuration 510, a memory interface 530, a configuration interface 520, a front end pipeline section 540, a frame rate conversion (FRC) and scaling pipeline section 550, a color processing and channel blending pipeline section 560, and a backend pipeline section 570.

Configuration interface 520 may receive control information 522 from an external component such as a processor via, for example an I2C interface. Configuration interface 522 may be used to configure input signal configuration 510, front end 540, frame rate conversion 550, color processor 560, backend 570, and memory interface 530. Input signal configuration 510 may be coupled to external inputs on dual video processor 400 in order to receive video signals on input 502 (such as HDTV signals, SDTV signals, or any other suitable digital video signals) and selected video signals 482 and 484 (FIG. 4). Input signal configuration 510 may then be configured to provide at least one of the received video signals (e.g., signals 482, 484 and 502) as video source streams 512 to front end 540.

Based on this configuration, various ones of these inputs provided to onboard video processing section 490 may be processed at different times using the onboard video processing pipeline. For example, in one embodiment dual video processor 400 may include eight input ports. Exemplary ports may include two 16-bit HDTV signal ports, one 20-bit HDTV signal port, three 8-bit SDTV video signal ports which may be in CCIR656 format, one 24-bit graphics port and one 16-bit external on-screen display port.

Front end 540 may be configured to select between at least one video signal streams 512 (i.e., channels) of the available inputs and process the selected video signal stream(s) along one or more video processing pipeline stages. Front end 540 may provide processed video signal stream(s) from one or more pipeline stages to frame rate conversion and scaling pipeline stage 550. In some embodiments, front end 540 may include three video processing pipeline stages and provide three separate outputs to FRC and scaling pipeline stage 550. In FRC and scaling pipeline stage 550 there may be one or more processing channels. For example, a first channel may include a main scaler and frame rate conversion unit, a second channel may include another scaler and frame rate conversion unit, and a third channel may include a lower cost scaler. The scalars may be independent of each other. For example, one scalar may upsize the input image while another may downsize the image. Both scalars may be capable of working with 444 pixels (RGB/YUB 24-bits) or 422 pixels (YC 16-bits).

Color processing and channel blending pipeline stage 560 may be configured to provide color management functions. These functions may include color re-mapping, brightness, contrast, hue & saturation enhancement, gamma correction and pixel validation. Additionally, color processing and channel blending pipeline stage 560 may provide video blending functions, overlaying different channels, or blend or overlay two blended video channels with a third channel.

Back end pipeline stage 570 may be configured to perform data formatting, signed/unsigned number conversion, saturation logic, clock delay, or any other suitable final signal operations that may be needed prior to the output of one or more channels from dual video processor 400.

Each of the various pipeline stage segments may be configured to send data to and receive data from off-chip memory 300 using memory interface 530. Memory interface 530 may include at least a memory controller and a memory interface. The memory controller may be configured to run at a maximum speed supported by the memory. In one embodiment, the data bus might be 32-bits and may operate at a frequency of 200 MHz. This bus may provide a throughput substantially close to 12.8 gigabits per second. Each functional block that uses memory interface 530 (i.e., memory client) may address the memory in a burst mode of operation. Arbitration between various memory clients may be done in a round robin fashion or any other suitable arbitration scheme. A more detailed discussion of the various pipeline segments is provided in connection with the description of FIGS. 12, 19, 20, 21 and 22.

Figure 6:
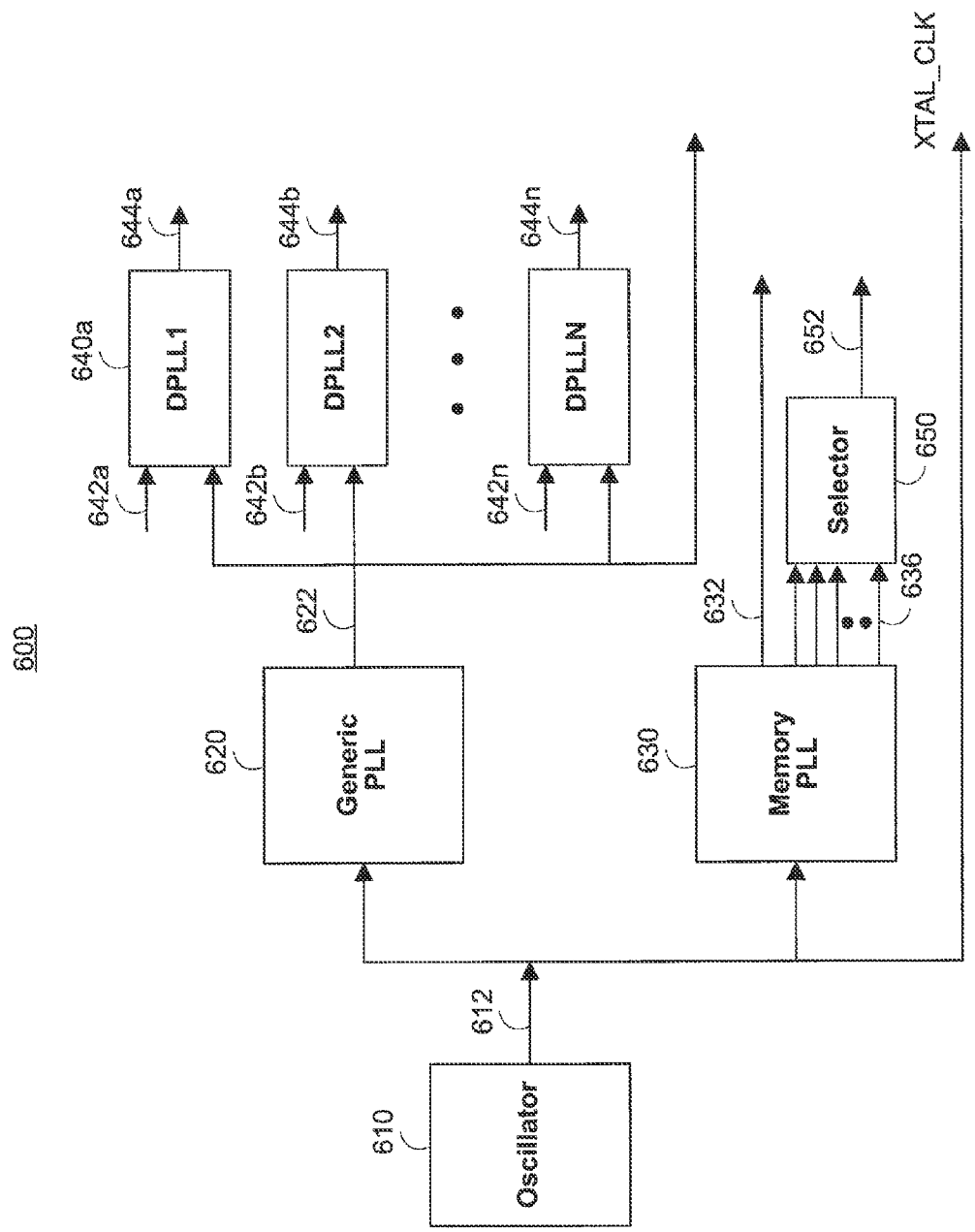
FIG. 6 is an illustration of a clock generation system in accordance with principles of the present invention.

Various components and pipeline stages in dual video processor 400 may require a different clocking mechanisms or clock frequencies. FIG. 6 illustrates a clock generation system 600 that generates a variety of clock signals for this purpose. Clock generation system 600 includes at least a crystal oscillator 610, generic analog phase-locked loop circuitry 620, digital phase locked loop circuitries 640*a-n* and memory analog phase-locked loop circuitry 630. The output 612 of crystal oscillator 610 may be coupled to generic phase locked loop 620, memory phase-locked loop 630, another component in dual video processor 400, or any suitable component external to the processor as needed.

Memory analog phase-locked loop circuitry 630 may be used to generate a memory clock signal 632 and additionally other clock signals of different frequencies 636 which may be selected by selector 650 for use as a clock signal 652 to operate a memory device (e.g., 200 MHz DDR memory) or another system component.

Generic analog phase-locked loop 620 may generate a 200 MHz clock that may be used as a base clock for one or more digital phase-locked loop (PLL) circuitries 640*a-n*. Digital PLL circuitry 640*a-n* may be used in open loop mode, where it behaves as a frequency synthesizer (i.e., multiplying the base clock frequency by a rational number). Alternatively, digital PLL circuitry 640a-n may be used in closed loop mode, where it may achieve frequency lock by locking onto a respective input clock signal 642a-n (e.g., a video sync input). The digital PLL has the ability, in closed loop mode, to achieve accurate frequency lock to very slow clock signals. For example, in the realm of video processing the vertical video clock signal (e.g., v-sync) may be in the range of 50 to 60 Hz. Various system components may use outputs 644a-n of digital PLL circuitry 640a-n for different operations that may require a variety of open loop or closed loop signals. Each of outputs 640a-n should be understood to be capable of providing clock signals of different frequencies or the same frequencies.

For example, one component that may use clock signals generated by digital PLL circuitry 640a-n is dual decoder 420 (FIG. 4), the operation of which is described in more detail in connection with FIGS. 7, 8, 9, and 10. Dual decoder 420 may include the decoders 422 (FIG. 4). Decoders 422 may be used in various modes of operation as described in connection with FIGS. 7, 8, and 9.

FIGS. 7, 8, and 9 illustrate three exemplary modes of operation using decoders 422 to generate video signals 426 and 428. These three modes of operation may provide for example, composite video signals, s-video signals, and component video signals.

A first of these three modes, which may be used to generate composite video signals, is shown in connection with FIG. 7. The first decoder mode may include a DC restore unit 720, an analog to digital converter 730, and decoder 422 each of which may be included in dual decoded 420 (FIG. 4). Video signal 425 (FIG. 4), which may be provided by dual tuner 410 or in an alternative arrangement by multiplexor 424, is provided to DC restore unit 720. DC restore unit 720 may be used when video signal 425, which may be an AC coupled signal, has lost its DC reference and should have it periodically reset in order to retain video characteristic information such as brightness. The video signal from DC restore unit 720 is digitized by analog to digital converter 730 and provided to decoder 422.

In the first mode, decoder 422 may use the digitized video signal 732 from a single analog to digital converter to generate a composite video signal. Analog to digital converter 730 and decoder 422 may operate by receiving digital clock signals 644a-n (FIG. 6)—which may be, for example, 20, 21, 22, 23, 24, 25, 26, 27, 28, 29, or 30 MHz. Additionally, decoder 422 may control the operation of DC restore unit 720 using an output feedback signal 427. Output feedback signal 427 may be, for example, a 2-bit control signal that instructs DC restore unit 720 to increase or decrease the DC output on the video signal provided to analog to digital converter 730.

A second of the three modes, which may be used to generate s-video signals, is shown connection with FIG. 8. The second decoder mode may include all of the elements described in the first mode in addition to a second analog to digital converter 820. Video signal 425 (FIG. 4) may be split into a first portion 812 and a second portion 810. First portion 812 of the signals of video signal 425 (FIG. 4), which may be provided by multiplexor 424, may be provided to DC restore unit 720 and a second portion 810 of the signals of video signal 425 (FIG. 4) may be inputted to second digital to analog converter 820. First portion 812 of video signal 425 from DC restore unit 720 is digitized by second analog to digital converter 730 and provided to decoder 422. Additionally, second portion 810 of video signal 425 is also provided to decoder 422 by analog to digital converter 820. S-Video signals require a two wire analog port for connecting to various devices (e.g., VCR, DVD player, etc.).

In this second mode, decoder 422 may use the digitized video signals 732 and 832 from two analog to digital converters 730 and 820 to generate an s-video signal. Analog to digital converters 730 and 820 and decoder 422 may operate by receiving digital clock signals 644a-n (FIG. 6)—which may be, for example, 20, 21, 22, 23, 24, 25, 26, 27, 28, 29, or 30 MHz. In some embodiments, first portion 812 of the video signal may be the Y-channel of video signal 425 and the second portion 810 of video signal 425 may be the chroma channel of the video signal.

A third of the three modes, which may be used to generate component video signals, is shown in connection with FIG. 9. The third decoder mode may include all the elements described in the second mode in addition to a second and third DC restore unit, 930 and 920, and a multiplexor 940. Video signal 425 may be split into a first portion 914, a second portion 910, and a third portion 912. First portion 914 of the video signal 425 (FIG. 4), which may be provided by multiplexor 424, may be provided to DC restore unit 720, second portion 910 of the signals of video signal 425 (FIG. 4) may be provided to DC restore unit 930, and third portion 912 of the signals of video signal 425 (FIG. 4) may be provided to DC restore unit 920. Component video signals require a three wire analog port for connecting to various devices (e.g., VCR, DVD player, etc.).

First portion 914 of video signal 425 from DC restore unit 720 is digitized by analog to digital converter 730 and provided to decoder 422. Second and third portions 910 and 912 of video signals 425 from DC restore units 930 and 920 are selectively digitized (e.g., by being selected using multiplexor 940) by analog to digital converter 820 and provided to decoder 422. Multiplexor 940 may receive control signals 429 from decoder 422 in order to time multiplex second and third portions 910 and 912 of video signal 425 through analog to digital converter 820.

In the third mode, in some embodiments, decoder 422 may use the digitized video signals 732 and 832 from the two analog to digital converters 730, 820 to generate a component video signal. Analog to digital converters 730 and 820 and decoder 422 may operate by receiving digital clock signals 644a-n (FIG. 6)—which may be, for example, 20, 21, 22, 23, 24, 25, 26, 27, 28, 29, or 30 MHz. Additionally, decoder 422 may control the operation of DC restore units 720, 930, and 920 using an output feedback signal 427. In some embodiments, first, second and third portions 914, 910 and 912 of video signal 425 may be the Y-channel, U-channel and V-channel, respectively, of video signal 425.

It should be understood that various commonly available types of DC restore units, digital to analog converters and video decoders may be used to perform the aforementioned functions and for the sake of brevity, their particular operations are being omitted from this discussion.

Figure 10:
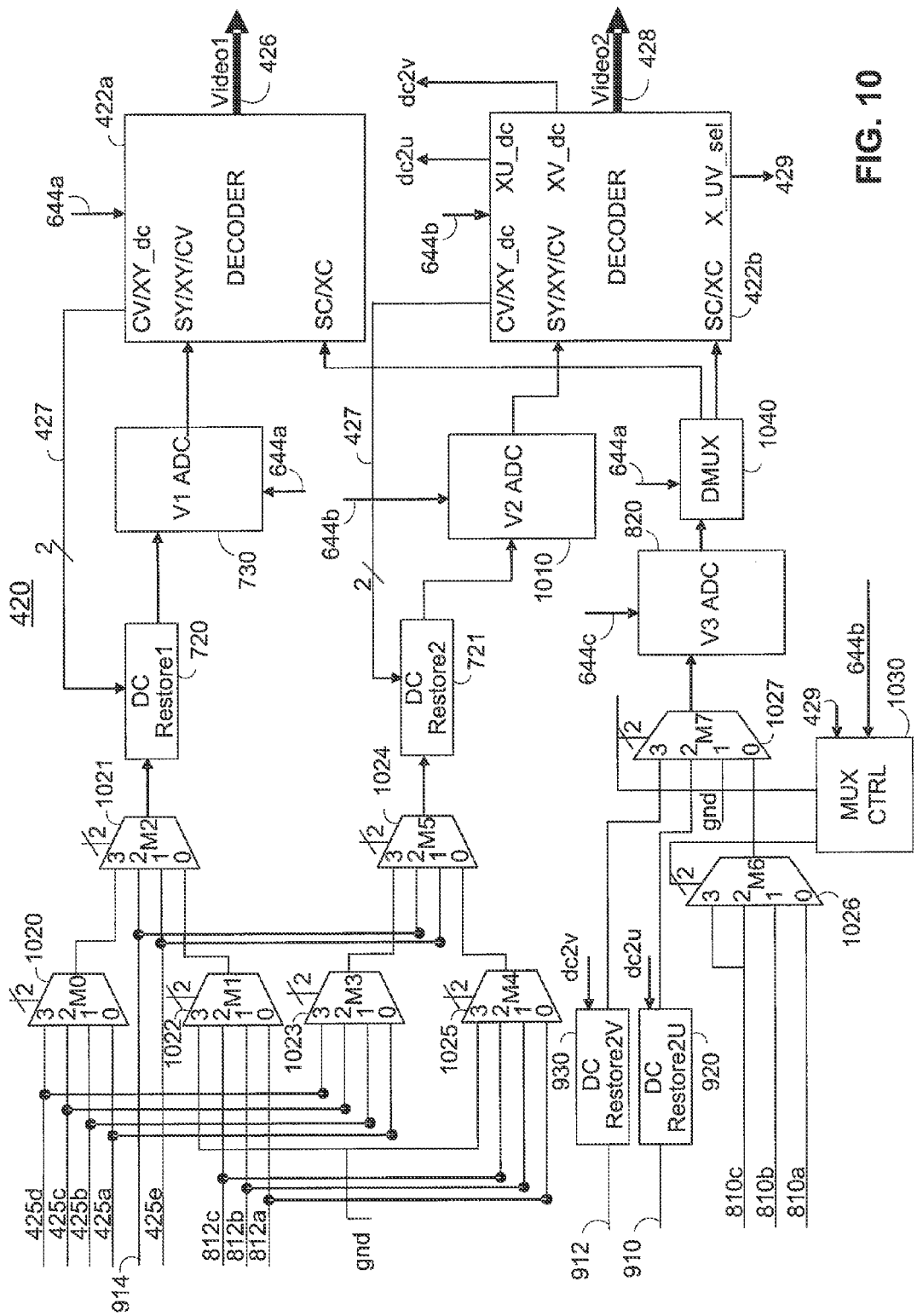
FIG. 10 is an illustration of an exemplary implementation of using two decoders to generate three video signals in accordance with principles of the present invention.

In one embodiment show in FIG. 10, all three decoder modes may be implemented using two of decoders 422 and three of analog to digital converters 730 or 820. The arrangement described in FIG. 10 may enable dual decoder 420 (FIG. 4) to provide at least two video signals 426 and 428 (i.e., one video signal from each decoder) substantially simultaneously that may correspond to any two of the three modes.

FIG. 10 illustrates an exemplary implementation of using two decoders to generate either two composite video signals, one composite and one s-video signals, one composite and one component video signals, or two s-video signals. The exemplary implementation shown in FIG. 10 includes, a set of multiplexors 1020, 1022, 1023, 1025, 1021, 1024, 1026, 1027, and 1028; three analog to digital converters 730, 820, 1010; four DC restore units 720, 721, 930, 920; a demultiplexor 1040; and two decoders 422a and 422b.

The exemplary implementation of FIG. 10, when used to generate two composite video signals, may operate in the following manner. A first video signal 425a may be coupled to the first input of multiplexor 1020 and a second video signal 914 may be coupled to the second input of multiplexor 1024. The first input of multiplexor 1020 may be selected and output to the fourth input of multiplexor 1021 to be input to DC restore unit 720. The second input of multiplexor 1024 may be selected and output to DC restore unit 721. The operations of the remaining portions of the implementation are similar to that which was described in connection with FIG. 7 in which a composite video signal is generated. For example, DC restore units 720 and 721, analog to digital converters 730 and 1010, and decoders 422a and 422b operate in a similar manner to generate the composite video signals as described in FIG. 7.

The generation of one composite and one s-video signals or one composite and one component video signals using the exemplary implementation shown in FIG. 10 is performed in a similar manner as the generation of two composite video signals described above. For example, first and second video signal portions 812 and 810 of video signal 425 used for generating s-video signals are provided to multiplexors 1022 and 1026. The outputs of multiplexors 1022 and 1026 are provided to multiplexors 1021 and 1027 which select the video signals that are to be processed by analog to digital converters 730 and 820. Similarly, multiplexor 1024 selects which video signals are to be processed by analog to digital converter 1010. A more detailed description of the multiplexor input selections for the various modes of operation are depicted in Table 1 shown below.

The exemplary implementation shown in FIG. 10 also enables the generation of two s-video signals 426 and 428. To provide this functionality, a first clock signal 644a operating at a first frequency and a first phase (e.g., 20 MHz) is provided to analog to digital converter 730 and to decoder 422a. A second clock signal 644b operating at a second frequency that may be 180 degrees out of phase from the first clock signal (e.g., 20 MHz at 180 degree out of phase) may be provided to analog to digital converter 1010 and to decoder 422b. A third clock signal 644c at a third frequency that is substantially double the frequency of the first clock signal and having the same phase as the first clock signal (e.g., 40 MHz) may be provided to analog to digital converter 820. Clock signal 644b is provided to multiplexor 1030 to selectively couple clock signal 644b to multiplexors 1026 and 1027. By coupling the clock signals to the select inputs of multiplexors 1026 and 1027 it is possible to perform time-division multiplexing on video signal inputs 810a-c on analog to digital converter 820. Clock signal 644a is coupled to demultiplexor 1040 to demultiplex the time divided video signal. A more clear description of the time-division multiplexing operations is provided in connection with FIG. 11.

Figure 11:
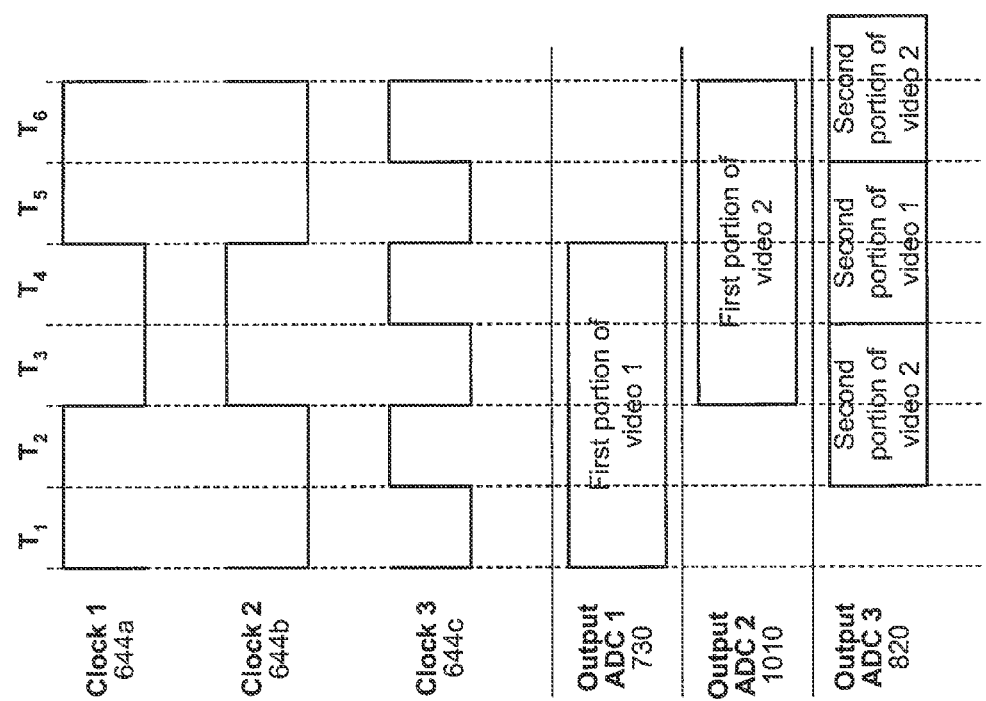
FIG. 11 is an exemplary timing diagram for time division multiplexing two portions of two video signals in accordance with principles of the present invention.

FIG. 11 illustrates an exemplary timing diagram for time-division multiplexing two second portions 810 of two video signals 425. By time division multiplexing the operations, the need for a fourth analog to digital converter may be obviated thereby reducing the total cost of dual video processor 400. The timing diagram shown in FIG. 11 includes, three clock signals that correspond to the first, second and third clock signals 644a, 644b and 644c respectively, and outputs of three analog to digital converters 730, 1010, and 820. As shown in the diagram clock 1 and clock 2 operate at half of the frequency of clock 3 and change with the falling edge of clock 3.

As shown, between the time period of T1 and T4, a full period of clock 644a (clock 1) completes and the output of analog to digital converter 730 (ADC 1) corresponding to the first portion 812a-c of a first video signal (S0) is available for processing by decoder 422a. On the rising edge of clock 3 at the beginning of time period T2, analog to digital converter 820 (ADC 3) begins processing a second portion 810a-c of a second video signal (S1) and completes processing at the end of time period T3.

At the beginning of time period T3, analog to digital converter 820 (ADC 2) begins processing a first portion 810a-c of video signal S1 and completes at the end of time period T6. The output of ADC 2 corresponding to the first portion 810a-c of video signal S1 becomes available for processing by decoder 422b at the end of time period T6. On the rising edge of clock 3 at the beginning of time period T4, analog to digital converter 820 (ADC 3) begins processing a second portion 810a-c of video signal S0 and completes processing at the end of time period T5.

Thus, at the end of time period T6, two portions of two video signals S0 and S1 have completed processing using only three analog to digital converters.

On the rising edge of clock 3 between the time periods T5 and T6, demultiplexor 1040 provides the output of second portion 810a-c of video signal S0 from ADC 3 to decoder 644a for producing processed video signal 426. At the same time second portion 812 of video signal S1 is selected for processing by analog to digital converter 820 (ADC 3) and becomes available at the end of time period T7.

The foregoing demonstrates one embodiment for producing two s-video signals 426 and 428 using three analog to digital converters 730, 1010, and 820. Table 1 below summarizes the various exemplary select signals that may be provided to the corresponding multiplexors for producing various combinations of composite (cst), component (cmp) and s-video signals (svid).

TABLE 1

| Video1 | Video2 | M0_sel | M1_sel | M2_sel | M3_sel | M4_sel | M5_sel | M6_sel | M7_sel |
|---|---|---|---|---|---|---|---|---|---|
| 425a (cst) | 425e (cst) | 0, 0 | X, X | 1, 1 | X, X | X, X | 0, 1 | X, X | X, X |
| 425a (cst) | 910, 912, 914 (cmp) | 0, 0 | X, X | 1, 1 | X, X | X, X | 1, 0 | X, X | 1, 429 |
| 425b (cst) | 812a, 810a (svid) | 0, 1 | X, X | 1, 1 | X, X | 0, 0 | 0, 0 | 0, 0 | 0, 0 |
| 812a, 810a (svid) | 812b, 810b (svid) | X, X | 0, 0 | 0, 0 | X, X | 0, 1 | 0, 0 | 0, 644b | 0, 0 |
| 812a, 810a (svid) | 812c, 810c (svid) | X, X | 0, 0 | 0, 0 | X, X | 1, 0 | 0, 0 | 644b, 0 | 0, 0 |
| 812b, 810b (svid) | 812c, 810c (svid) | X, X | 0, 1 | 0, 0 | X, X | 1, 0 | 0, 0 | 644b, 1 | 0, 0 |

Dual decoder 420 may also be configured to handle unstable analog or digital signals which may be received from a video cassette recorder (VCR). Unstable signals may be produced by a VCR due to various modes of operation such as fast forwarding, fast rewinding or pausing modes. Dual decoder 420 may be able to process these types of signals to provide a good quality output signal during such situations.

Unstable video signals may be caused by un-stable sync signals generated by the VCR. One suitable technique for processing unstable sync signals may be to buffer the unstable video signal. For example a first-in-first-out (FIFO) buffer may be placed near the output of the decoder. First, the decoder output data may be written to the FIFO buffer using unstable sync signals as the reference. The sync signals and the clock may be re-generated or re-created from a logic block within the decoder and may then be used for reading the data from the FIFO buffer when such modes of operation are encountered. Thus, the unstable video signal may be output with a stable sync signal. In all other scenarios or modes of operation, the FIFO buffer may be bypassed and the output may be the same as the FIFO's input.

Alternatively, implementing FIFO buffers in the off-chip memory may enable the proper processing of unstable sync signals. For example, when an unstable sync signal is detected, the decoder may be placed in 2-D mode thereby using less off-chip memory. A substantial portion of off-chip memory 300, which is normally used for 3-D operations, becomes free and may be used for implementing the aforementioned FIFO buffer (i.e., the equivalent of at least one full data vector is available as free memory space). Moreover, the FIFO buffer inside the off-chip memory may be capable of storing the pixels for a full frame, so even if the write and read rates are not matched, at the output the frames either get repeated or get dropped. The repeating or dropping of a particular frame or of fields within a frame may still enable the system to display a reasonably good picture.

Figure 12:
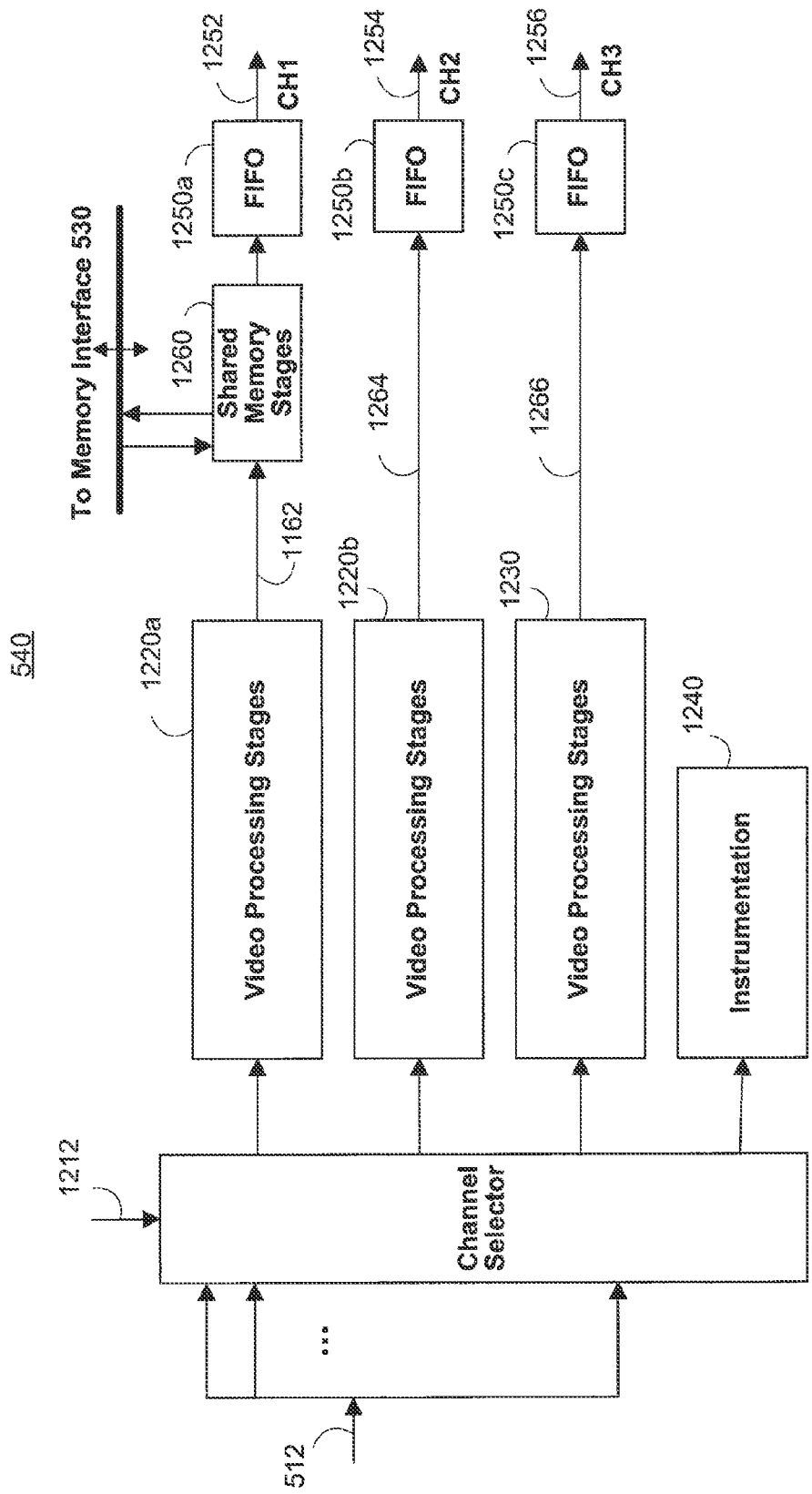
FIG. 12 is a detailed illustration of the functions of the front end video pipeline of the dual video processor in accordance with principles of the present invention.

FIG. 12 illustrates in more detail the exemplary functionality of front end 540 within the video pipeline. In particular, channel selector 1212 may be configured to select four channels from multiple video source streams 512. The four channels may be processed along 4 pipelined stages within front end 540. In some embodiments, the four channels may include: a main video channel, a PIP channel, an on-screen display (OSD) channel, and a data instrumentation or testing channel.

Front end 540 may implement various video processing stages 1220a, 1220b, 1230, and 1240 on any of the channels. In some embodiments, the various channels may share one or more resources from any of the other stages to increase processing power of the various channels. Some examples of functions that may be provided by video processing stages 1220a and 1220b may include noise reduction and de-interlacing which may be used for producing maximum picture quality. The noise reduction and de-interlacing functions may also share off-chip memory 300 and, as such the memory is denoted as shared memory stages 1260 which will be described in more detail in connection with the description of FIGS. 13 and 15. To avoid overcrowding the drawing, shared memory stages 1260 are shown in FIG. 12 as being part of the processing stages corresponding to channel 1. However, it should be understood that one or more shared memory stages 1260 may be part of any of the channel pipelines in front end 540.

Noise reduction may remove impulse noise, Gaussian noise (spatial and temporal), and MPEG artifacts such as block noise and mosquito noise. De-interlacing may include generating progressive video from interlaced video by interpolating any missing lines using edge-adaptive interpolation in the presence of motion. Alternatively, de-interlacing functions may use a combination of temporal and spatial interpolation adaptively based on motion. Both the noise reducer and de-interlacer may operate in the 3-D domain and may require storing fields of frames in off-chip memory. Hence, the de-interlacer and noise reducer may act as clients to memory interface 530 which may be used to access off-chip memory. In some embodiments, the noise reducer and de-interlacer may share the off-chip memory to maximize memory space and process data in the most efficient manner—as shown by the shared memory stages 1260. This process will be described in more detail in connection with the description of FIGS. 13 and 15.

Any of the three video processing stages 1220a, 1220b, and 1230 may run format conversion to convert a video signal into the desired domain. For example, this type of conversion may be used to change an input video signal stream to YC 4:2:2 format in 601 or 709 color-space.

Front end 540 may also provide an instrumentation pipeline 1240 to run data instrumentation functions. Instrumentation pipeline 1240 may be used, for example, to find the start and end pixel and line positions of an active video or to find the preferred sampling clock phase when there is a controllable phase sampler (ADC) upstream. Performing these operations may help in auto-detecting input channel parameters such as resolution, letter-boxing, and pillar-boxing. Moreover, detecting such channel parameters may aid in using them to control features like scaling and aspect ratio conversion through a micro-controller or any other suitable processing element. Front end 540 may also run sync video signal instrumentation functions on all four channels in order to detect a loss of sync signal, a loss of clock signal, or an out-of-range sync or clock signal. These functions may also be used to drive power management control through a micro-controller or any other suitable processing element.

At the end of front end 540, a set of FIFO buffers 1250a-c may sample the video stream to provide sampled video signals 1252, 1254, and 1256, which may be used for retiming the selected channels, between front end 540 and frame rate conversion and scaling 550 (FIG. 5) pipeline stages.

Figure 13:
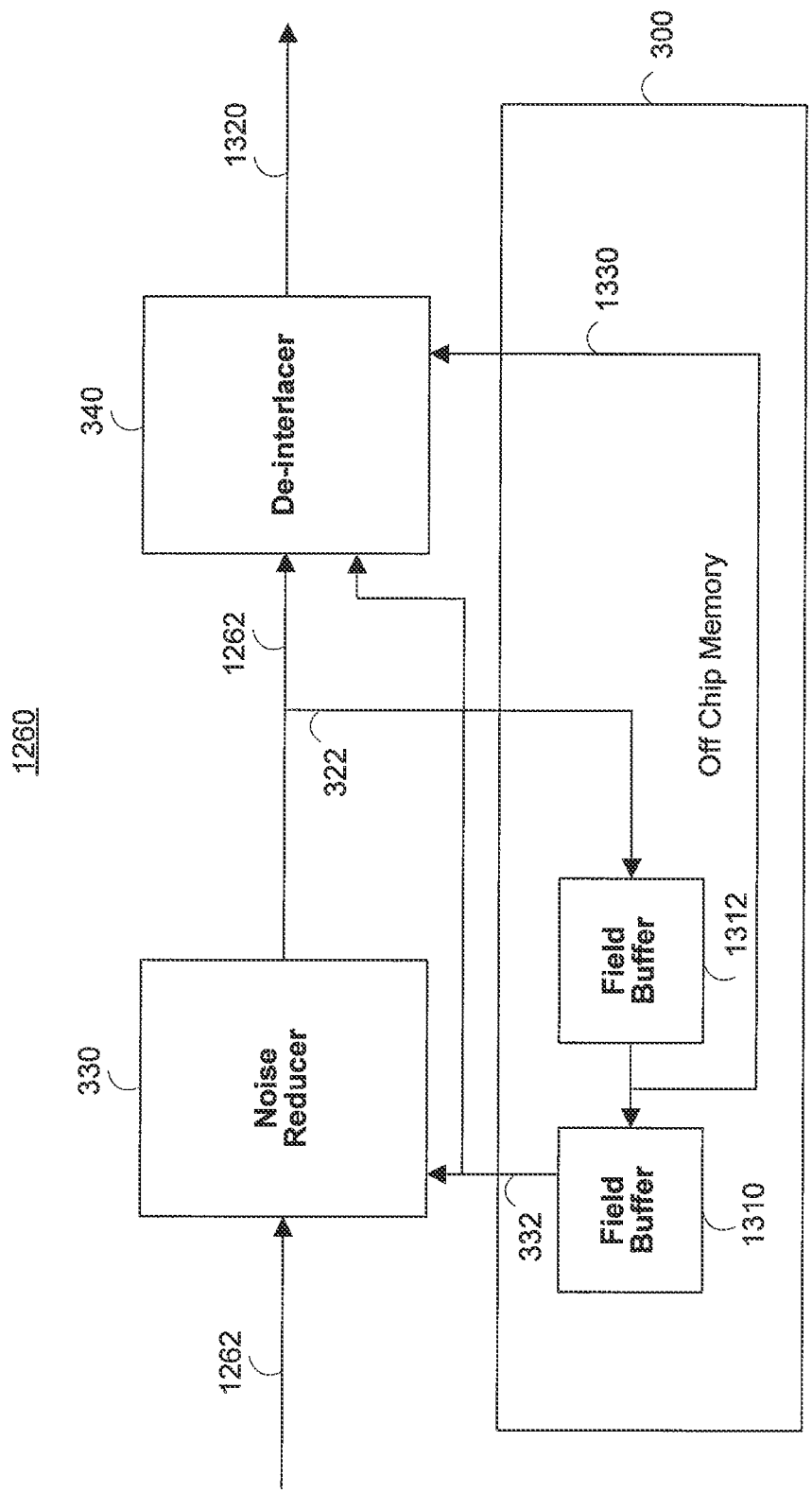
FIG. 13 is an illustration of off-chip memory access operations of a noise reducer and a de-interlacer in accordance with principles of the present invention.
Figure 15:
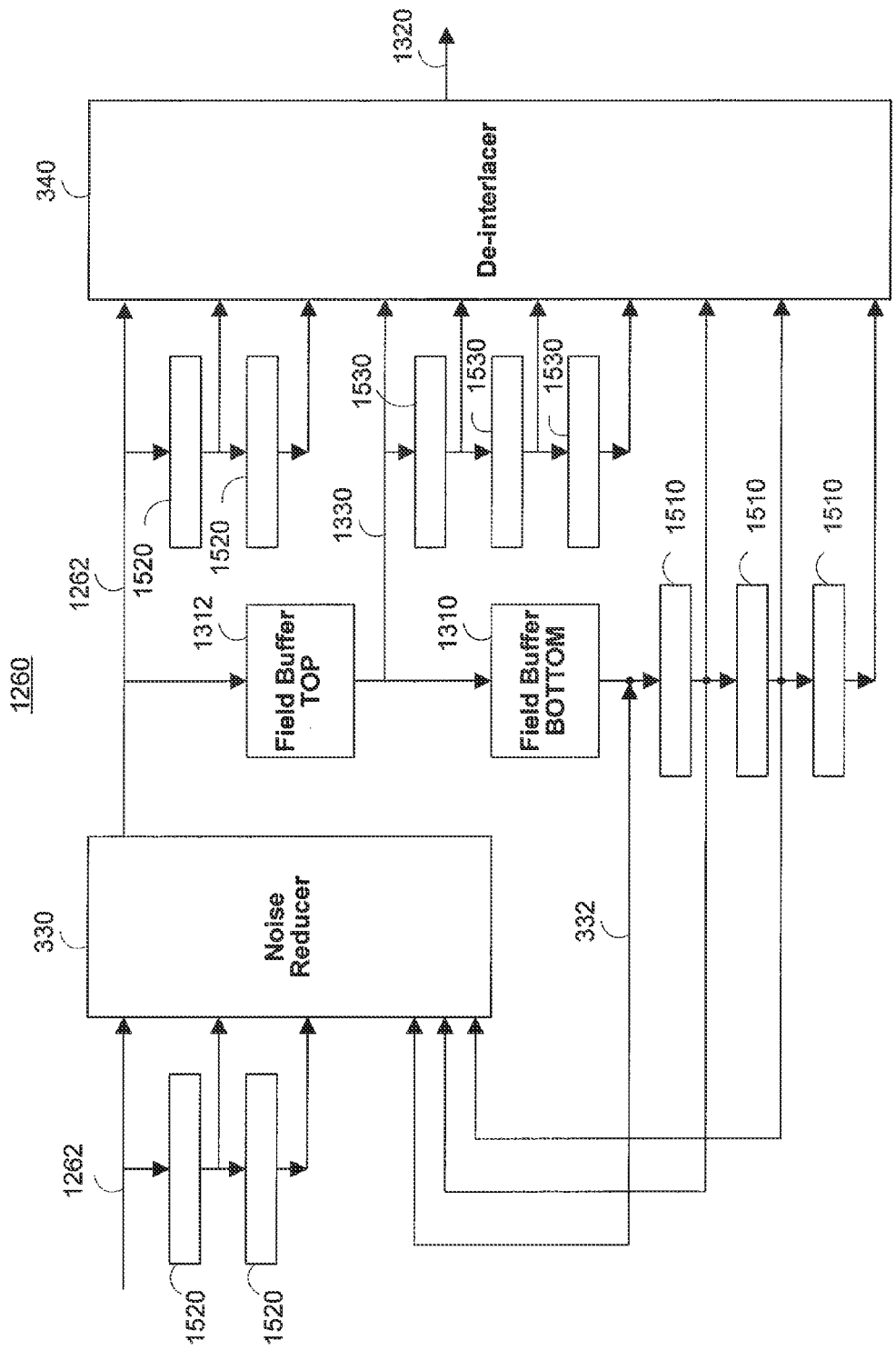
FIG. 15 is an illustration of multiple field line processing in accordance with principles of the present invention.

A more detailed description of shared memory stages 1260 is provided in connection with the description of FIGS. 13 and 15. In particular, as illustrated in FIG. 13 the shared memory stages 1260 may include at least the functions of a noise reducer 330 and a de-interlacer 340. Both of these functions are temporal functions that may need frame storage in order to produce a high-quality image. By enabling various memory access blocks (i.e., memory clients) to share off-chip memory 300, the size of off-chip memory 300 and bandwidth required for interfacing with off-chip memory 300 may be reduced.

Noise reducer 330 may operate on two fields of the interlaced input in 3-D mode. The two fields that noise reducer 330 may operate on may include live field 1262 and a field that was two fields prior to live field 1262 (i.e., previous to the previous field 332 or twice delayed noise reduced field 332). De-interlacer 340 may operate on three interlaced fields in 3-D mode. The three fields may include a live field 1262, a previous field 1330 (e.g., once delayed field), and a previous to the previous field 332 (e.g., twice delayed field).

Figure 14:
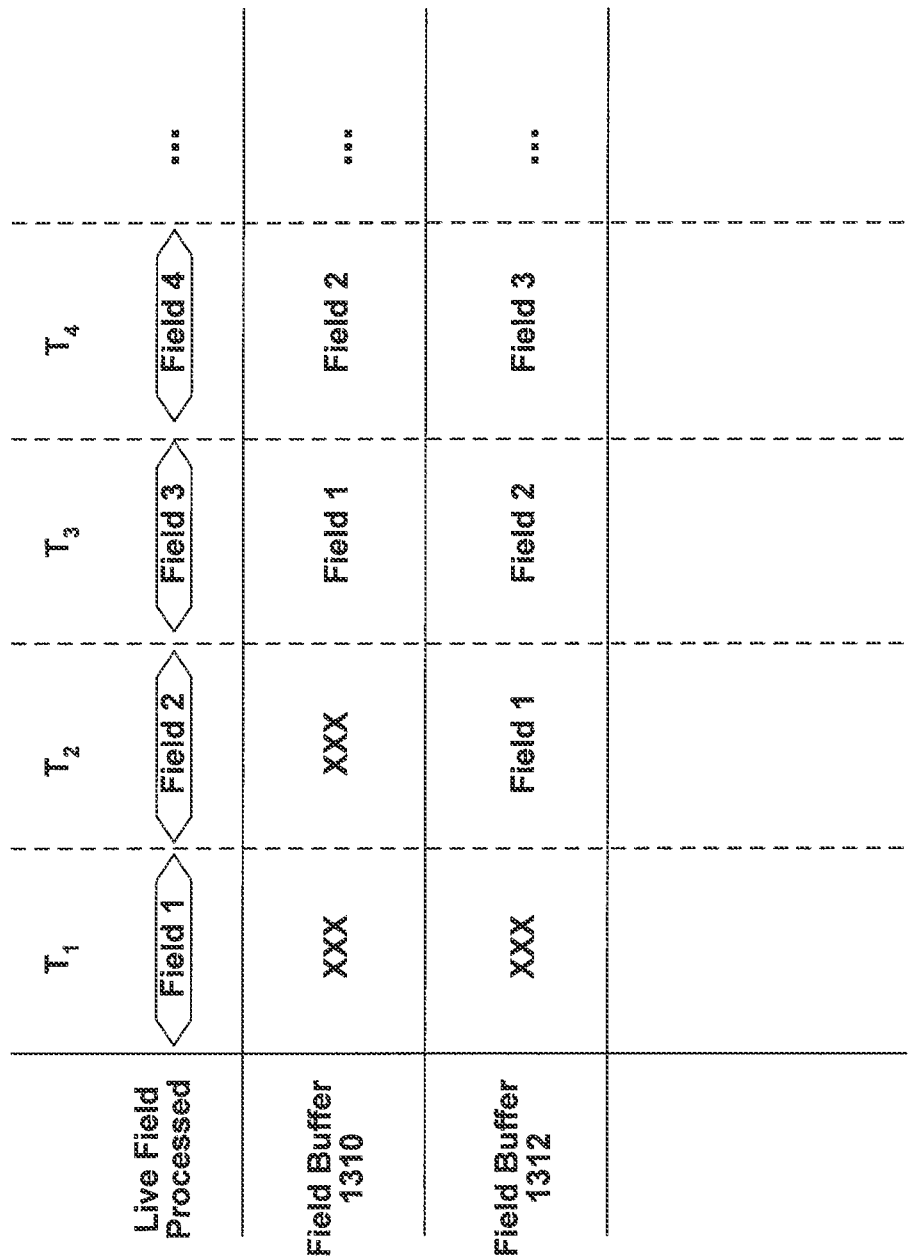
FIG. 14 is an exemplary illustrative timing diagram of the off-chip memory access operations of a noise reducer and a de-interlacer in accordance with principles of the present invention.

As shown in FIG. 13 and FIG. 14 the field buffers 1310 and 1312 may be shared by noise reducer 330 and de-interlacer 340. Noise reducer 330 may read from off-chip chip memory 300 a previous to the previous field 332 from field buffer 1310 and process it with live field 1262 to provide noise reduced output 322. Noise reduced output 322 may be written to off-chip memory 300 into field buffer 1312. De-interlacer 340 may read from off-chip chip memory 300 a previous field 1330 from field buffer 1312 and previous to the previous field 332 from field buffer 1310 and process the read fields with either live field 1262 or noise reduced output 322 and provide de-interlaced video 1320 as output.

For example as illustrated in FIG. 14, live field 1262 (FIELD 1) may be provided to noise reducer 330 for outputting noise processed output 322 during a first time period (i.e., T1). After or before noise reducer 330 completes processing FIELD 1 (i.e., during a time period T2), noise reduced output 322 (FIELD 1) may be provided by noise reducer 330 to de-interlacer 340 or alternatively, may bypass noise reducer 330 and be provided directly to de-interlacer 340 via 1262 (e.g., if no noise reduction is required). In either case, during the second time period (i.e., time period T2), noise reduced output 322 (FIELD 1) may be written to field buffer 1312 in off-chip memory 300 by noise reducer 330.

The output 1330 of field buffer 1312 (FIELD 1) may be read by de-interlacer 340 from off-chip memory 300 during the time period T2, while processing the next live field in the frame (FIELD 2). Field buffer 1312 subsequently provides the noise reduced output (FIELD 1) that was processed previous to the noise processed output 322 (FIELD 2) (i.e., previous to the live field or once delayed noise reduced live field).

After or before noise reducer 330 completes processing the next field in live field 1262 (FIELD 2) during a third time period (i.e., T3), the previous to the live field 1330 of field buffer 1312 may be written to field buffer 1310. The next noise reduced output 322 (FIELD 2) may be written to field buffer 1312 in place of the noise reduced output (FIELD 1). During time period T3, the contents of field buffer 1312 is noise reduced output (FIELD 2) (i.e., previous live field or once delayed noise reduced live field) and the contents of field buffer 1310 is noise reduced output (FIELD 1) (i.e., previous to previous the live field or twice delayed noise reduced live field).

Figure 3:
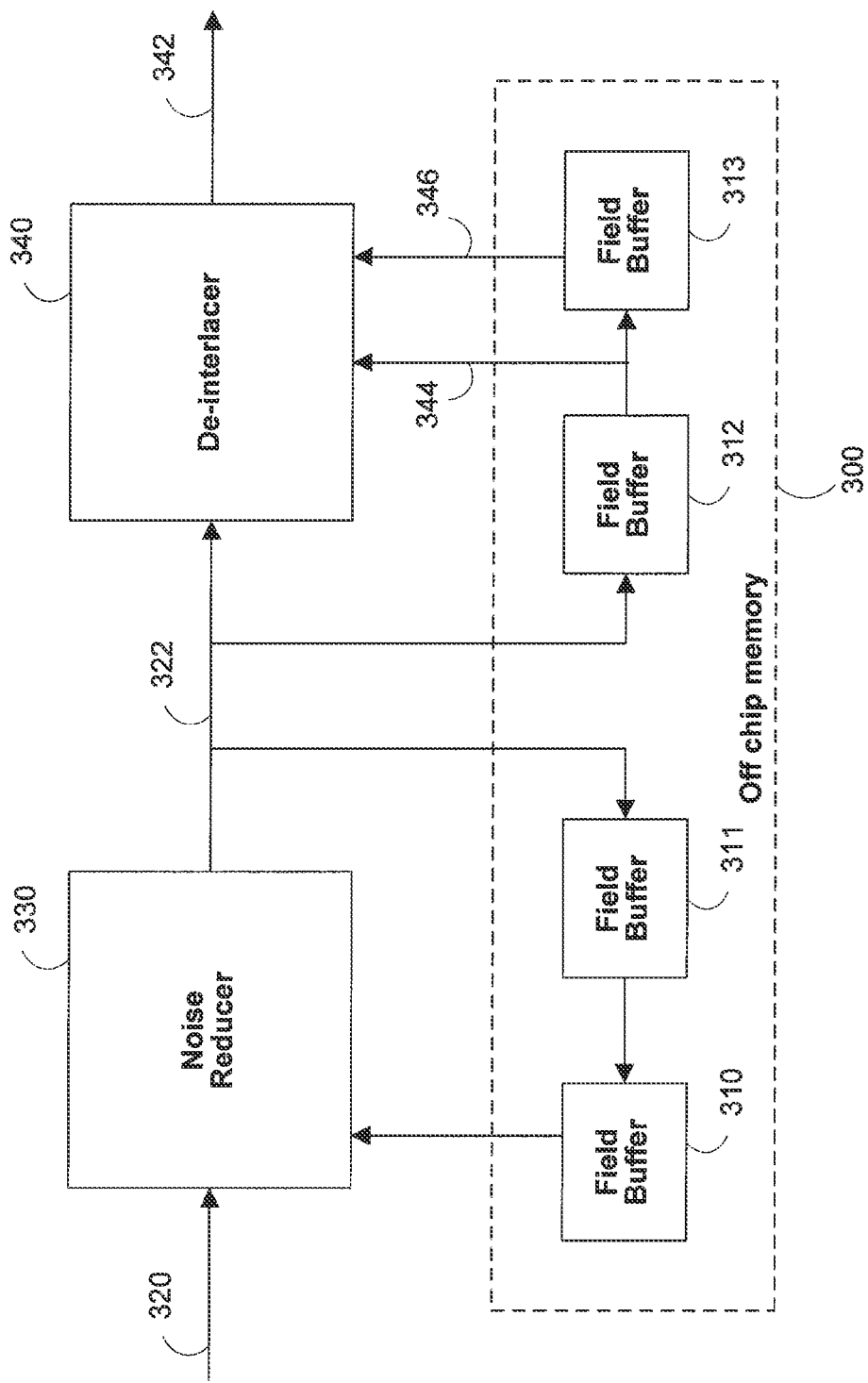
FIG. 3 is an illustration of off-chip memory access operations of a noise reducer and a de-interlacer in a typical video processor.

During time period T3, noise reducer 330 may operate on live field 1262 (FIELD 3) and the previous to the previous live field 332 (FIELD 1). During the same time period T3, de-interlacer 340 may operate on live field 1262 (FIELD 3) or the noise reduced output (FIELD 3), live field previous to the live field 1330 (FIELD 2), and live field previous to the previous live field 332 (FIELD 2). The sharing of off-chip memory 300 between noise reducer 330 and de-interlacer 340 thereby results in using only 2-field buffer locations whereas illustrated in FIG. 3, four field buffer locations are typically required in off-chip memory 300 for providing similar functionality.

By reducing the number of field buffer locations in memory, additional video processing pipelines may be provided with equal processing power and more memory storage and bandwidth, thereby enabling the high-quality video processing of at least two channels. Furthermore, the data transfer bandwidth between dual video processor 400 and off-chip memory 300 may be reduced as only a single write port and two read ports may be used to provide the aforementioned functionality.

In some other embodiments, noise reducer 330 and de-interlacer 340 may operate on multiple field lines in each frame simultaneously. As illustrated in FIG. 15, each of these field lines may be stored in live field line buffers 1520, previous live field line buffers 1530, and previous to the previous live field line buffers 1510. Line buffers 1510, 1520, and 1530 may be storage locations in dual video processor 400 that may provide high efficiency and speed in storing and accessing data. To further reduce the amount of storage space, line buffers 1510, used by both noise reducer 330 and de-interlacer 340, may be shared among the noise reducer and the de-interlacer modules.

As illustrated in FIG. 15, as live field 1262 is received by noise reducer 330 and de-interlacer 340, in addition to the operation described in connection with FIGS. 13 and 14 for storing the live field in field buffer 1312, live field 1262 may also be stored in live field line buffers 1520. This enables noise reducer 330 and de-interlacer 340 to access multiple live field lines received at different time intervals simultaneously. Similarly, the contents stored in field buffer locations 1310 and 1312 may be moved to the corresponding line buffers 1510 and 1530, respectively in turn providing buffering for previous live field (noise reduced output previous to the live field) and previous to the previous live field lines (noise reduced output previous to the previous live field). This enables noise reducer 330 and de-interlacer 340 to access multiple previous live field lines and previous to the previous live field lines simultaneously. As a result of including field line buffers, noise reducer 330 and de-interlacer 340 may operate on multiple field lines simultaneously. Consequently, because the noise reducer 330 and de-interlacer 340 share access to the previous to the previous live field, stored in field buffer location 1310, they may also share access to corresponding field line buffers 1510. This in turn may reduce the amount of storage required on or substantially close to dual video processor 400.

Although only three line buffers are shown in FIG. 15, it should be understood that any number of field line buffers may be provided. In particular, the number of field line buffers that are provided depend on the amount of storage space available on dual video processor 400 and/or the number of simultaneous field lines that may be needed by noise reducer 330 and de-interlacer 340. However, it should be understood that any number of additional noise reduction units and de-interlacing units may be provided to aid in processing multiple field lines.

For example, if two noise reducers 330 and two de-interlacers 340 that can each process three live field lines simultaneously are provided, then eight live field line buffers 1520, six previous live field line buffers 1530, and six previous to the previous live field line buffers 1510 may be used to process multiple field lines—where the outputs of each field line buffer would be coupled to the corresponding inputs of the noise reducers and de-interlacer units. In fact, it has been contemplated that the contents of one or more frames can be stored in the field buffers if the number of required noise reducers and de-interlacers and on-chip space is available.

Figure 16:
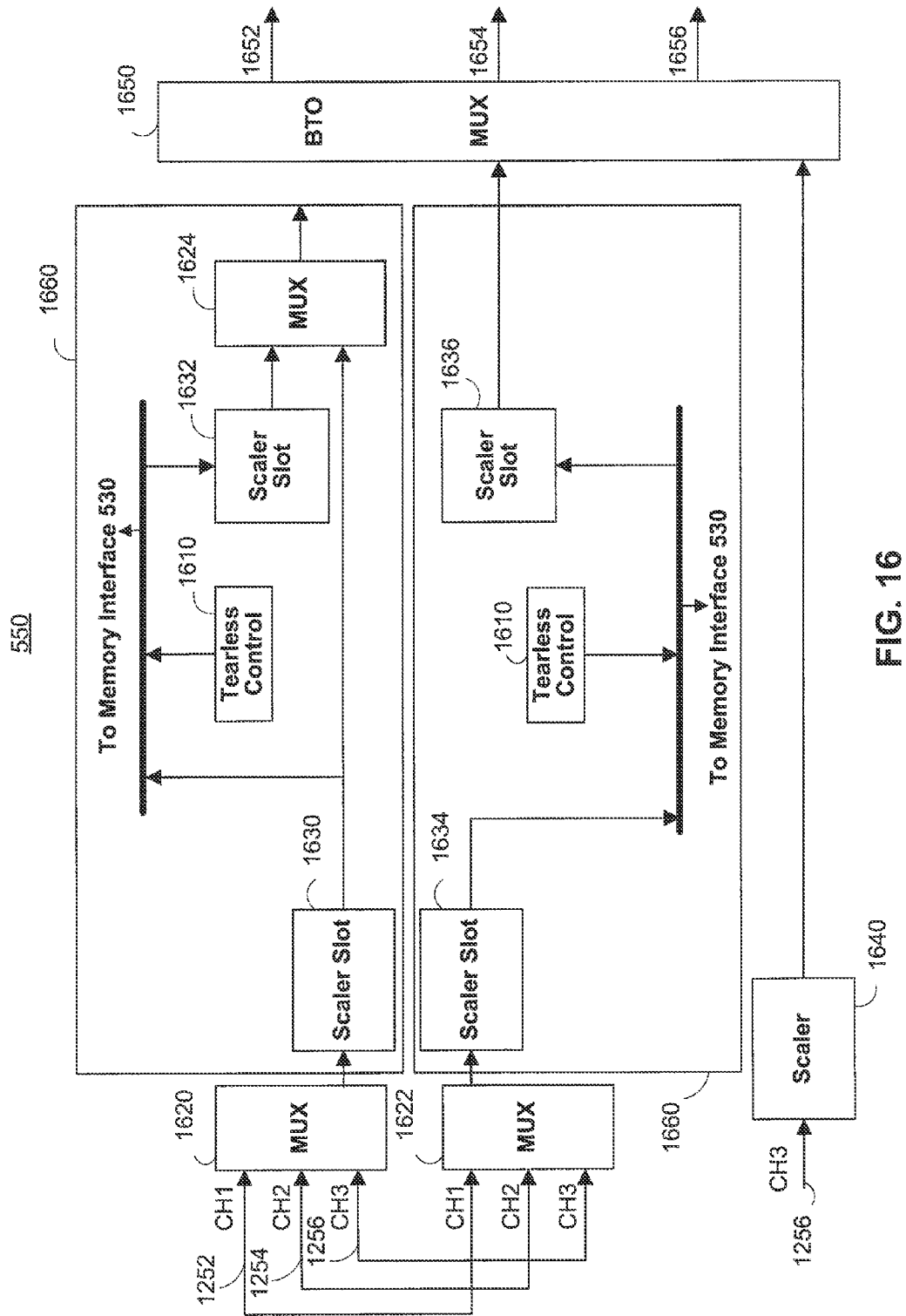
FIG. 16 is a detailed illustration of performing frame rate conversion and scaling in accordance with principles of the present invention.

FIG. 16 illustrates in more detail frame rate conversion and scaling pipeline 550 (FIG. 5) (FRC pipeline). FRC pipeline 550 may include at least scaling and frame rate conversion functionality. In particular, the FRC pipeline 550 may include at least two modules used for scaling that may be placed in two of scaler slots 1630, 1632, 1634, and 1636—one scaler for providing scaling on a first channel and one for providing scaling on a second channel. The advantages of this arrangement will become more apparent in the description of FIG. 17. Each of these scaling modules in scaler slots 1630, 1632, 1634, and 1636 may be capable of performing up-scaling or down-scaling in any scaling ratio. The scalers may also include circuitry for performing aspect ratio conversion, horizontal non-linear 3 zone scaling, interlacing and de-interlacing. Scaling in some embodiments may be performed in synchronous mode (i.e., the output is synchronous with the input) or through off-chip memory 300 (i.e., the output may be positioned anywhere with respect to the input).

FRC pipeline 550 may also include functionality for frame rate conversion (FRC). At least two of the channels may include frame-rate conversion circuitry. In order to perform FRC, video data should be written to a memory buffer and read from the buffer at the desired output rate. For example, an increase in frame rate results from reading the output buffer faster than the input frame thereby causing a particular frame to be repeated over time. A decrease in frame rate results from reading a frame to be outputted from a buffer at a slower rate than the particular frame is written (i.e., reading a frame slower than the input rate). Frame tearing or video artifacts may result from reading a particular frame during the period in which video data is available (i.e., active video).

In particular, in order to avoid video artifacts such as frame tearing appearing within an active video, the repetition or dropping of frames should happen over entire input frames and not in the middle of fields within a frame. In other words, the discontinuity in video should happen only across frame boundaries (i.e., during the vertical or horizontal sync in which no picture data is provided) and not within the region of active video. A tearless control mechanism 1610 may operate to alleviate discontinuities between frames by for example, controlling when a memory interface 530 reads a portion of a frame in memory. FRC may be performed in normal mode or in tearless mode (i.e., using tearless control mechanism 1610).

In addition to the two scalers that are placed in two of scaler slots 1630, 1632, 1634, and 1636 in each of the first and second channels, there may be a further lower end scaler 1640 on a third channel. The lower end scaler 1640 may be a more basic scaler, for example, a scaler that performs only 1:1 or 1:2 up-scaling or any other necessary scaling ratios. Alternatively, one of the scalers in the first and second channels may perform scaling on the third channel. Multiplexors 1620 and 1622 may control which of the at least three channels are directed to which of the available scalers. For example, multiplexor 1620 may select channel 3 for performing a first type of scaling operation in a scaler in slot 1630 or 1632 and multiplexor 1622 may select channel 1 for performing a second type of scaling operation in a scaler in slot 1634 or 1636. It should be understood that one channel may also use any number of available scalers.

FRC pipeline 550 also may include a smooth-movie mode in order to reduce motion jitter. For example, there may be a film-mode detection block in the de-interlacer that detects the mode of an input video signal. If the video input signal is run at a first frequency (e.g., 60 Hz), it may be converted to either a higher frequency (e.g., 72 Hz) or a lower frequency (e.g., 48 Hz). In the case of converting to a higher frequency, a frame-repeat indication signal may be provided from the film-mode detection block to the FRC block. The frame-repeat indication signal may be high during a first set of the frames (e.g., one of the frames) and low during a second set of frames (e.g., four frames) of data that may be generated by the de-interlacer. During the portion of time that the frame-repeat indication signal is high, the FRC may repeat a frame consequently generating the correct sequence of data at the higher frequency. Similarly, in the case of converting to a lower frequency, a frame-drop indication signal may be provided from the film-mode detection block to the FRC block. During the time period that the frame-drop indication signal is high a particular set of frames are dropped out of a sequence consequently generating the correct sequence of data at the lower frequency.

Depending on the type of scaling that is desired, as shown in scaler positioning module 1660, a scaler may be configured to be placed in various scaler slots 1630, 1632, 1634, and 1636. Scaler slots 1632 and 1636 are both located after the memory interface, although scaler slot 1632 corresponds to the scaling operation performed on a first channel and scaler slot 1636 corresponds to the scaling operation performed on a second channel. As illustrated, one scaler positioning module 1660 may include a multiplexor 1624 which selects the output that corresponds to a particular scaler configuration, while another scaler positioning module 1660 may not include a multiplexor but instead may have the output of the scaler coupled directly to another video pipeline component. Multiplexor 1624 provides the flexibility of implementing three modes of operation (described in more detail in connection with FIG. 17) using only two scaler slots. For example, if multiplexor 1624 is provided, a scaler positioned in slot 1630 may be coupled to the memory for providing down-scaling or up-scaling and also coupled to multiplexor 1624. If no memory operations are desired, the multiplexor 1624 may select the output of scaler slot 1630. Alternatively, if memory operations are required, scaler in scaler slot 1630 may scale the data and multiplexor 1624 may select the data from another scaler which up-scales or down-scales the data and is placed in scaler slot 1632. The output of multiplexor 1624 may then be provided to another video pipeline component such as a blank time optimizer 1650 which is described in more detail in connection with the description of FIG. 18.

Figure 17:
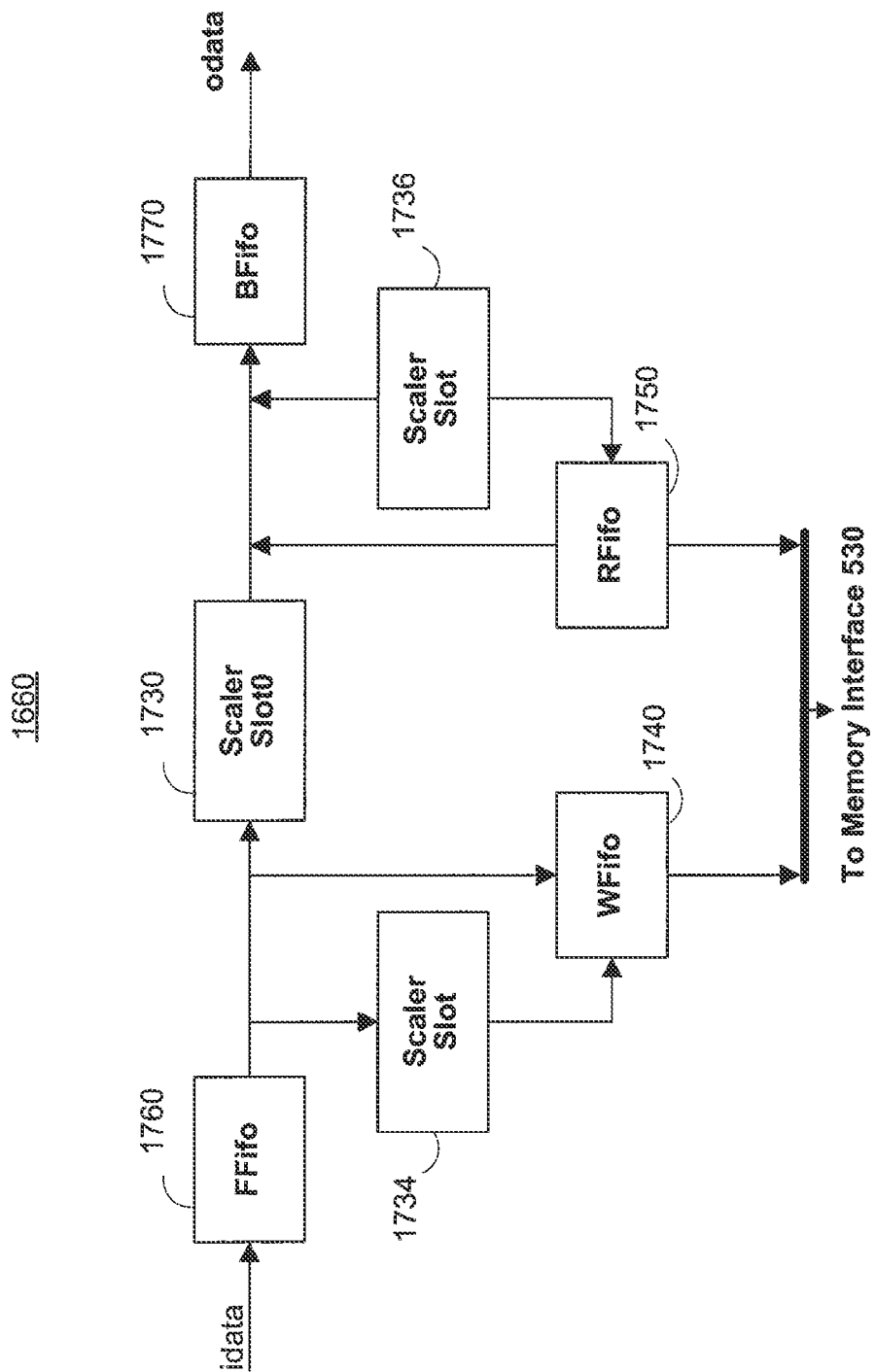
FIG. 17 is an illustration of a scaler positioning module in accordance with principles of the present invention.

As illustrated in FIG. 17, scaler positioning module 1660 may include at least an input FIFO buffer 1760, a connection to memory interface 530, at least one of three scaler positioning slots 1730, 1734, and 1736, a write FIFO buffer 1740, a read FIFO buffer 1750, and an output FIFO buffer 1770. Scaler positioning slots may correspond to the slots described in FIG. 16. For example, scaler positioning slot 1734 may correspond to slots 1630 or 1634, similarly scaler positioning slot 1730 may correspond to slot 1630—as described above using multiplexor 1624 enables slot 1630 to provide the functionality of scaler positioning slots 1730 and 1734. One or two scalers may be positioned in any one or two of three scaler positioning slots 1730, 1734, or 1736 with respect to memory interface 530. Scaler positioning module 1660 may be part of any channel pipeline in FRC pipeline 550.

When synchronous mode is desired the scaler may be positioned in scaler positioning slot 1730. In this mode, FRC may be absent from the system, obviating the need to access memory by the particular FRC channel pipeline. In this mode, the output v-sync signals may be locked to the input v-sync signals.

The scaler may alternatively be positioned in scaler positioning slot 1734. It may be desired to position the scaler in slot 1734 when FRC is needed and the input data should be downscaled. Down-scaling the input data before writing to the memory (i.e., because a smaller frame size may be desired), consequently reduces the amount of memory storage that may be required. Since less data may be stored to the memory, the output data read rate may be reduced, thereby also reducing the total memory bandwidth that is required (and in turn reducing the cost) and providing a more efficient system.

In another scenario, the scaler may be positioned in scaler positioning slot 1736. It may be desired to position the scaler in slot 1736 when FRC is needed and the input data should be up-scaled. The data may be provided to the memory at a lower rate than the output data that is read (i.e., the frame size is smaller at the input than at the output). In turn, less data may be written to the memory by storing the smaller frame and later using the scaler at the output to increase the frame size. For example, if on the other hand, the scaler was positioned before the memory in slot 1734 and was used to upscale the input data, a larger frame would be stored to the memory thus requiring more bandwidth. However, in this case by positioning the scaler after the memory, a smaller frame may initially be stored to the memory (thus consuming less bandwidth) and later read back and up-scaled.

Since there may be two independent scalers in two separate scalar positioning modules 1660, for first and second channels, if there is a memory access requirement on both of these scalar positioning modules 1660, it may be the case that one of them requires high bandwidth and the other may require a low bandwidth memory access. Blank time optimizer (BTO) multiplexor 1650 may provide one or more storage buffers (large enough to store one or more field lines) in order to reduce memory bandwidth and enable any number of channels to share the stored field line—thereby reducing memory storage requirements.

Figure 18:
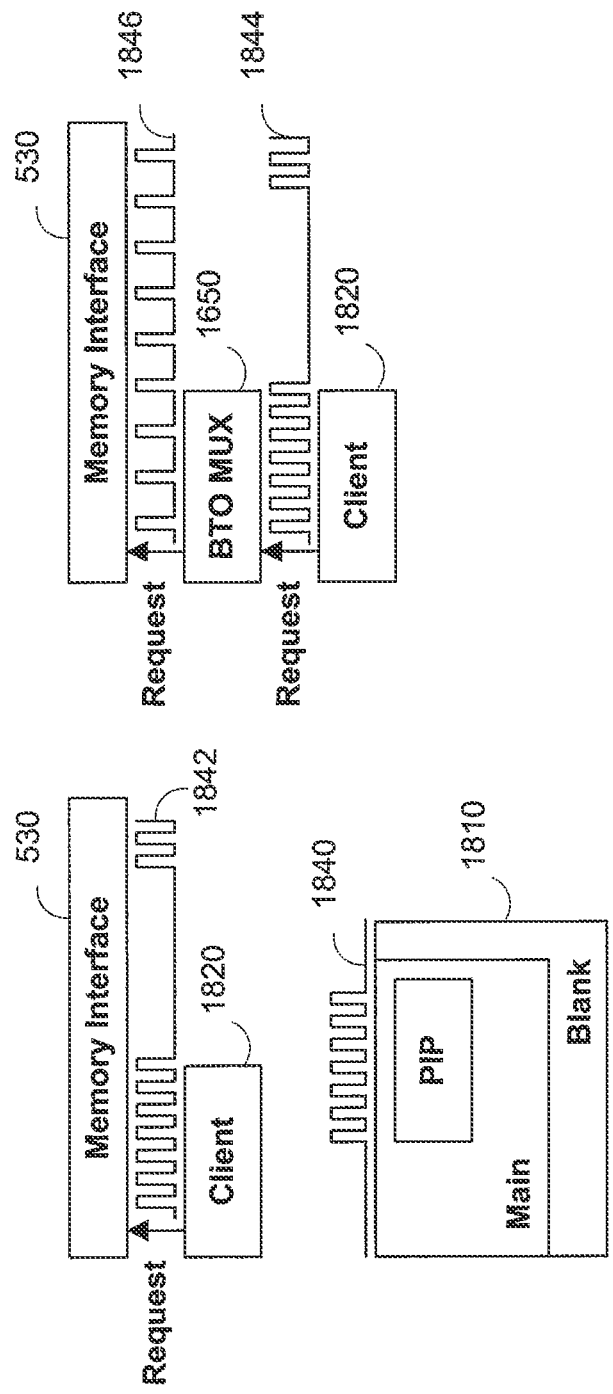
FIG. 18 is an illustrative example of the operation of a BTO multiplexor in accordance with principles of the present invention.

FIG. 18 is an illustrative example of the operation of BTO multiplexor 1650 (FIG. 16). As shown in FIG. 18, a first channel (Main) occupies a majority portion of screen 1810 and a second channel (PIP) occupies a smaller portion of screen 1810. As a consequence, the PIP channel may have less active data and require less access to memory than the Main channel over the same time interval thereby requiring less bandwidth.

For example, if one field line in a frame contains 16 pixels, the PIP channel may only occupy 4 pixels of the total field in the frame while the Main channel may occupy the remaining 12 pixels. The amount of time, therefore, that the PIP channel has to access the memory to process 4 pixels is four times longer than that of the Main channel and thereby requires less bandwidth as shown by memory access timeline 1840 (i.e., the PIP has a larger blank time interval). Therefore, in order to reduce the memory bandwidth that is required, the PIP channel may access the memory at a substantially slower rate and enable the Main channel to use the remaining bandwidth.

BTO multiplexor 1650 may be configured to use various clock rates when accessing memory on different channels. For example, when a slower clock rate may be desired on a particular channel, BTO multiplexor 1650 may receive the requested data from the memory accessing block (client) 1820 (i.e., PIP channel) using one clock rate 1844, store the data in a field line storage buffer, and access memory using a second clock rate (which may be slower) 1846. By preventing the client from using a high clock rate to access memory directly and instead using a field line buffer to access memory with a slower clock rate, the bandwidth requirement may be reduced.

BTO multiplexor 1650 may enable sharing of different channel field line buffers which may further reduce the amount of storage required by off-chip memory 300. This way BTO multiplexor 1650 may use the shared field line buffers to blend or overlay the different channels that share a portion of the display.

Figure 19:
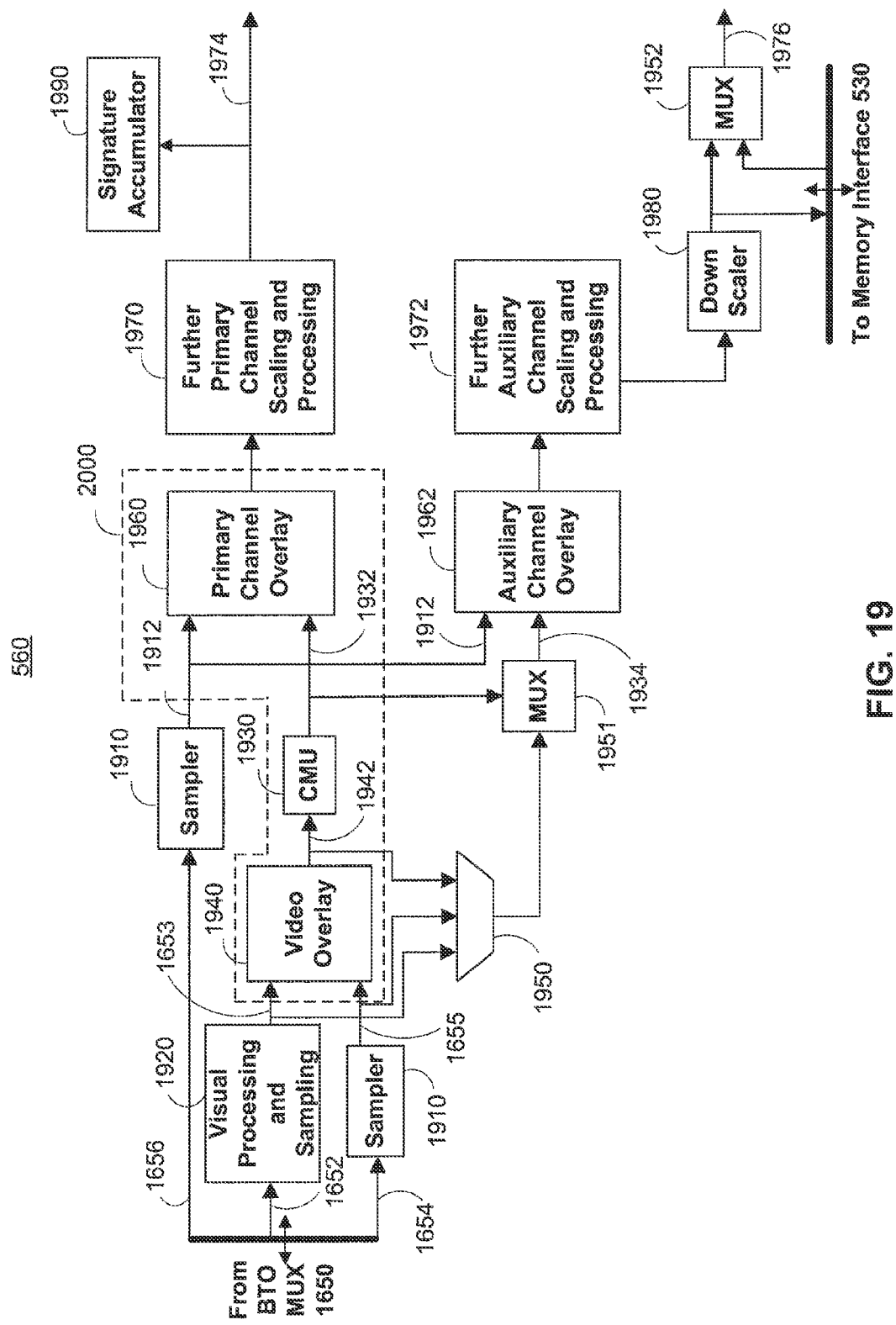
FIG. 19 is a detailed illustration of the color processing and channel blending (CPCB) video pipeline of the dual video processor in accordance with principles of the present invention.

The output of BTO multiplexor 1650 may be provided to color processing and channel blending video pipeline 560 (FIG. 5). FIG. 19 illustrates a more detailed description of the color processing and channel blending (CPCB) video pipeline 560. CPCB video pipeline 560 includes at least a sampler 1910, a visual processing and sampling module 1920, an overlay engine 2000, and auxiliary channel overlay 1962, further primary and auxiliary channel scaling and processing modules 1970 and 1972, a signature accumulator 1990, and a downscaler 1980.

The functions of CPCB video pipeline 560 may include at least improving video signal characteristics such as image enhancement by luma and chroma edge enhancement, and film grain generation and addition through blue noise shaping mask. Additionally, the CPCB video pipeline 560 can blend at least two channels. The output of the blended channels may be selectively blended with a third channel to provide a three channel blended output and a two channel blended output.

Figure 21:
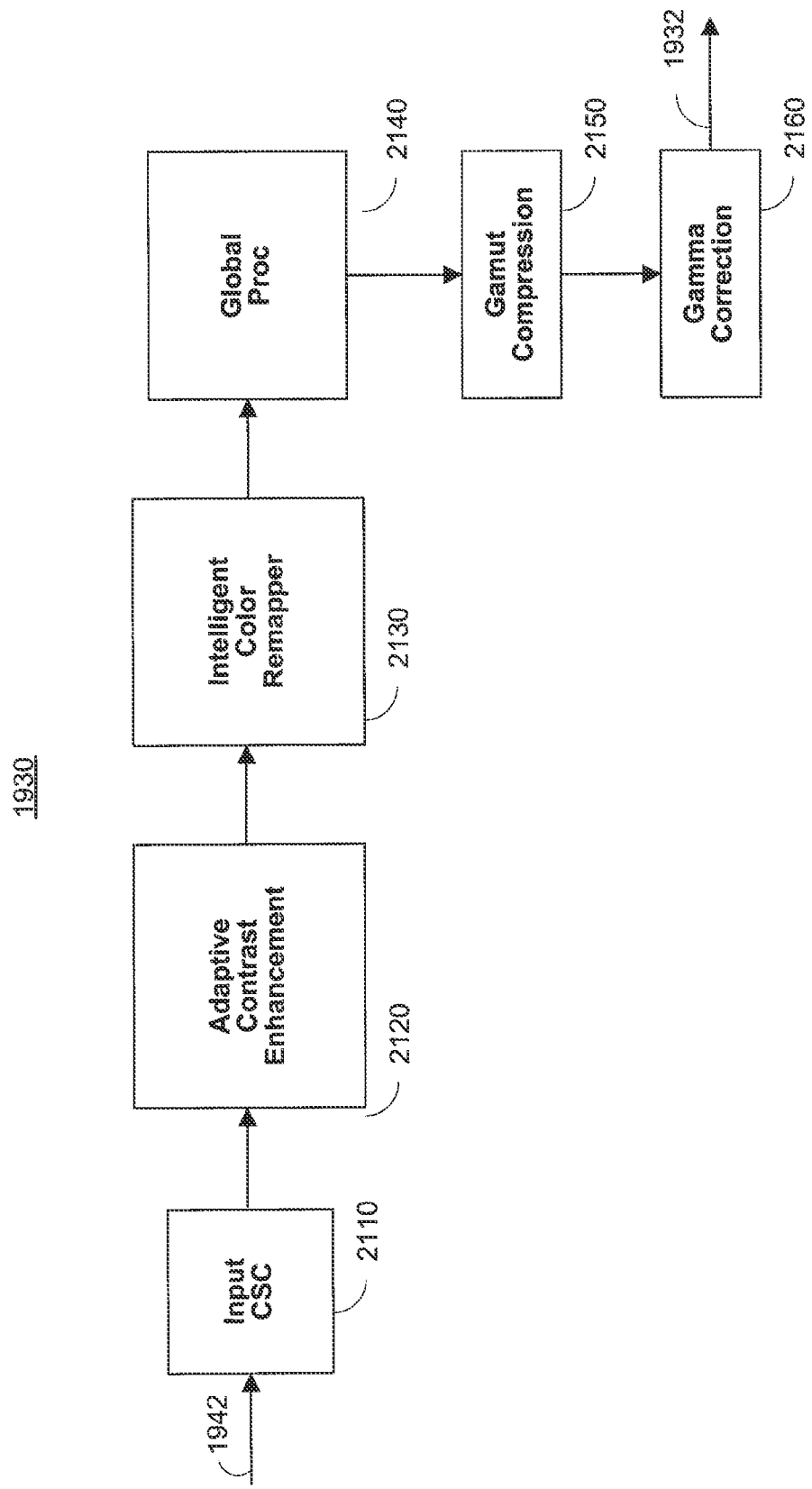
FIG. 21 is a detailed illustration of the color management unit in accordance with principles of the present invention.

As shown in FIG. 21, CMU 1930, which may be included in the overlay engine 2000 portion of the CPCB video pipeline 560, may improve at least one video signal characteristic. The video signal characteristics may include adaptive contrast enhancement 2120, brightness, contrast, hue and saturation adjustment globally in the image, intelligent remapping of color locally 2130, intelligent saturation control keeping the hue and brightness unchanged, gamma control through a look up table 2150 and 2160, and color space conversion (CSC) 2110 to desired color space.

The architecture of CMU 1930 enables the CMU to receive video channel signal 1942 in any format and convert the output 1932 to any other format. CSC 2110 in the front of the CMU pipeline may receive video channel signal 1942 and may convert any possible 3-color space into a video color processing space (e.g., converting RGB to YCbCr). Additionally, a CSC at the end of the CMU pipeline may convert from the color processing space into an output 3-color space. A global processing function 2140 may be used to adjust brightness, contrast, hue and/or saturation and may be shared with the output CSC. Since CSC and global processing function 2140 perform matrix multiplication operations, two matrix multipliers may be combined into one. This type of sharing may be performed by pre-computing the final coefficients after combining the two matrix multiplication operations.

CPCB video pipeline 560 may also provide dithering to a particular number of bits as may be required by a display device. An interlacer for the at least one of the channel outputs may also be provided. CPCB video pipeline 560 may also generate control outputs (Hsync, Vsync, Field) for at least one of the channel outputs that may be displayed on a device. Also, CPCB video pipeline 560 may separate brightness, contrast, hue and saturation adjustment globally for at least one of the output channels and provide extra scaling and FRC for at least one of the output channels.

Referring again to FIGS. 16 and 19, channel outputs 1656, 1652, and 1654 from FRC pipeline 550 are provided to CPCB video pipeline 560. First channel 1656 may be processed along a first path which may use sampler 1910 for up-sampling video signal on first channel 1656 and the output 1912 of sampler 1910 may be provided to both a primary channel overlay 1960 and an auxiliary channel over 1962 to produce a blended image for at least one of the outputs. Second channel 1652 may be processed along a second path that provides visual processing and sampling on module 1920. The output of the visual processing and sampling module 1920 (which may up-sample the video signal) may be input to video overlay 1940 (or overlay engine 2000) for blending or positioning a third channel 1654 (which may also be run through sampler 1910) with the output. The function of overlay engine 2000 will be described in more detail in connection with FIG. 20.

The output 1942 (which may be first video channel signal 1623 overlayed with second video channel signal 1625) of video overlay may be provided through CMU 1930 to primary channel overlay 1960 and may also be provided to a multiplexor 1950. In addition to receiving output 1942 of video overlay, multiplexor 1950 may also receive outputs of visual processing and sampling module 1920 and sampler 1910. Multiplexor 1950 operates to select which of its video signal inputs to provide to auxiliary channel overlay 1962. Alternatively, a multiplexor 1951 may select either the output of multiplexor 1950 or output 1932 of CMU 1930 to provide as video signal output 1934 to auxiliary channel overlay

1962. The arrangement of the processing units before the primary and auxiliary channel overlays enables the same video signal to be provided to the primary as well as the auxiliary channel overlays. After further processing by units 1970 and 1972, the same video signal (VI) may be simultaneously 1) output for display on primary output 1974 as a primary output signal and 2) undergo further down-scaling prior to being output for display or storage on auxiliary output 1976 as auxiliary output signal.

In order to provide independent control of data selection to both primary output 1974 and auxiliary output 1976, the primary and auxiliary channels may be formed by independently selecting first and second video channel signals 1932 and 1934 from the first and second video channel overlay module 1940. Auxiliary channel overlay module 1962 may select the first video channel signal 1652, the second video channel signal 1654, or the overlaid first and second video channel signal 1942. Since CMU 1930 is applied to first video channel signal 1652, second video channel signal 1654 may be selected either before or after CMU 1930 by multiplexor 1951 depending on whether the first and second video channel signals have the same or different color spaces. Additionally, first and second video channel signals 1932 and 1934 may have independent blending with third video channel signal 1656.

CPCB video pipeline 560 may also provide scaling and FRC for auxiliary output 1976 represented by downscaler 1980. This feature may be necessary in order to provide separate auxiliary output 1976 from primary output 1974. Since the higher frequency clock should be selected as the scaling clock, the CPCB video pipeline 560 may run off the primary output clock because the auxiliary clock frequency may be less than or equal to that of the primary clock. Downscaler 1980 may also have the capability of generating interlaced data, which may undergo FRC and output data formatting to be used as the auxiliary output.

In some scenarios, when the first channel is an SDTV video signal and primary output 1974 should be an HDTV signal while auxiliary output 1976 should be an SDTV video signal, CMU 1930 may convert the first channel SD video signal into HD video and then perform HD color processing. In this case, multiplexor 1950 may select as its output video signal 1942 (signal that may not be passed through CMU 1930) thereby providing an HD signal to primary channel overlay module 1960 and the processed SDTV signal to auxiliary channel overlay 1962. Further auxiliary channel scaling and processing module 1972 may perform color control for auxiliary output 1976.

In some other scenarios, when the first channel is an HDTV video signal and primary output 1974 should be an HDTV signal while auxiliary output 1976 should be an SDTV video signal, CMU 1930 may perform HD processing and multiplexor 1951 may select output of CMU 1932 to provide the HDTV processed signal to auxiliary channel overlay module 1962. Further auxiliary channel scaling and processing module 1972 may perform color control to change the color space into SDTV for auxiliary output 1976.

In some other scenarios, in which both primary and auxiliary outputs 1974 and 1976 should be SD video signals, further channel scaling and processing modules 1970 and 1972 may perform similar color control functions to place the signals in condition for output to corresponding primary and auxiliary outputs 1974 and 1976.

It should be understood that if a video channel does not use a particular portion of the pipeline in any of pipeline segments 540, 550, 560, and 570 (FIG. 5) then that portion may be configured to be used by another video channel to enhance video quality. For example, if second video channel 1264 does not use de-interlacer 340 in FRC pipeline 550, then first video channel 1262 may be configured to use de-interlacer 340 of second video channel pipeline in order to improve its video quality. As described in connection with FIG. 15, an additional noise reducer 330 and an additional de-interlacer 340 may increase the quality of a particular video signal by allowing shared memory pipeline segment 1260 to process additional field lines simultaneously (e.g., 6 simultaneous field line processing).

Some example output formats that may be provided using CPCB video pipeline 560 include National Television Systems Committee (NTSC) and Phase Alternating Line (PAL) primary and secondary outputs of the same input image, HD and SD (NTSC or PAL) primary and secondary outputs of the same input image, two different outputs in which a first channel image is provided on the primary output and a second channel image is provided on the auxiliary output, overlaid first and second channel video signals on the primary output and one channel video signal (first channel or a second channel) on the auxiliary output, different OSD blending factors (alpha values) on the primary and auxiliary outputs, independent brightness, contrast, hue, and saturation adjustments on the primary and auxiliary outputs, different color spaces for the primary and auxiliary outputs (e.g., Rec. 709 for primary output and Rec. 601 for auxiliary output), and/or sharper/smoother image on an auxiliary outputs through the use of different sets of scaling coefficients on a first channel scaler and a second channel scaler.

Figure 20:
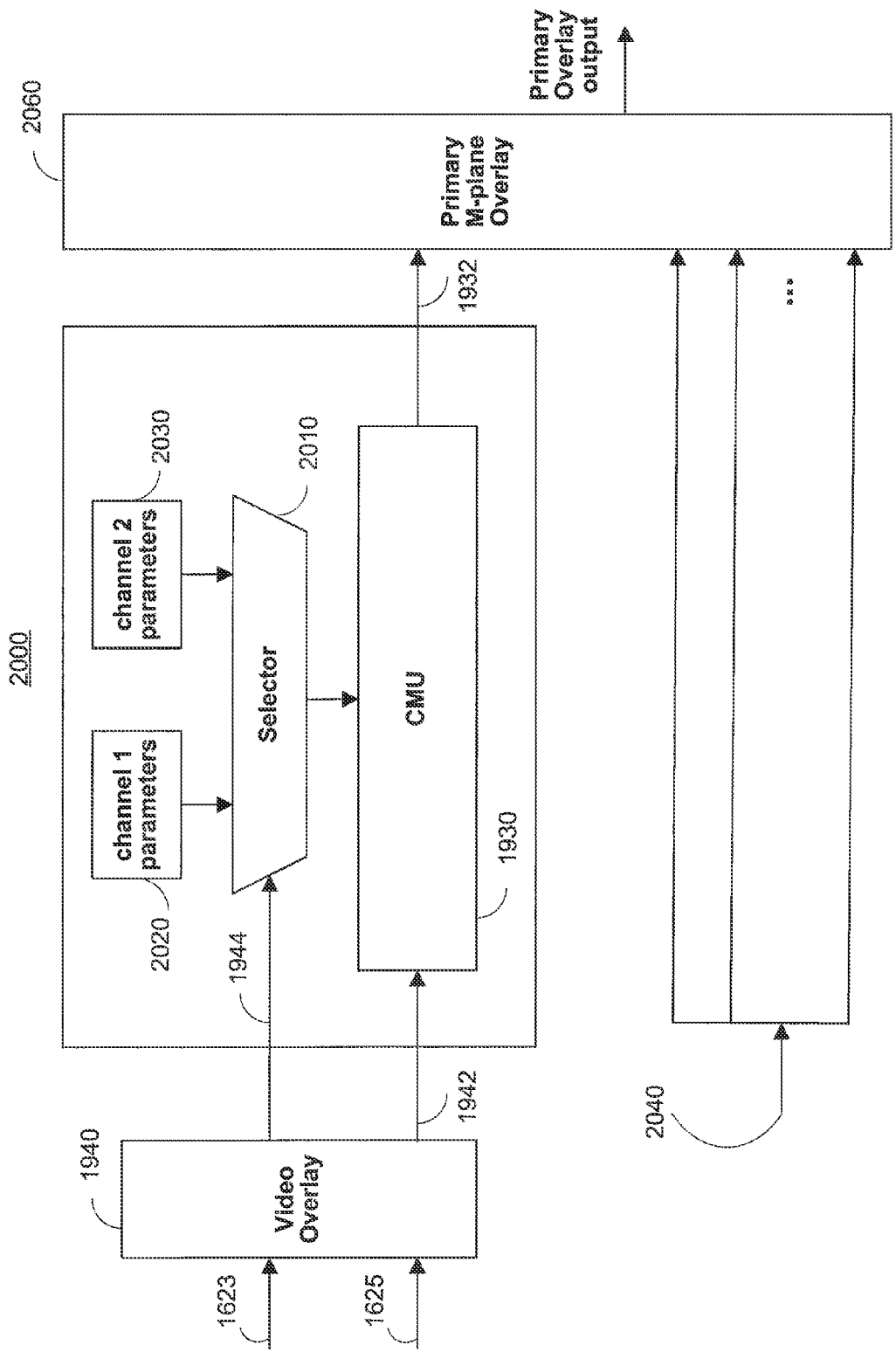
FIG. 20 is a detailed illustration of the overlay engine in accordance with principles of the present invention.

FIG. 20 illustrates in more detail overlay engine 2000 (FIG. 19). Overlay engine 2000 includes at least video overlay module 1940, CMU 1930, first and second channel parameters 2020 and 2030, a selector 2010, and a primary M-plane overlay module 2060. It should be understood that primary M-plane overlay 2060 is similar to primary channel overlay 1960 (FIG. 19) but may include additional functionality that may be used to blend or overlay further channel video signals 2040 with third channel input 1912 (FIG. 19).

Overlay engine 2000 may generate a single video channel stream by placing M available independent video/graphics planes on the final display canvas. In one particular embodiment overlay engine 2000 may generate a single channel stream by placing 6 planes on the final display canvas. Position for each plane on the display screen may be configurable. The priority of each plane may also be configurable. For example, if the position of the planes on the display canvas is overlapped, then priority ranking may be used to resolve which plane is placed on top and which plane may be hidden. The overlay may also be used to assign an optional border for each plane.

Examples of further video channel signals 2040 and their sources may include a main plane which may be first channel video signal 1652, PIP plane which may be second channel video signal 1654, char OSD plane which may be generated using an on-chip character OSD generator, bit-mapped OSD plane which may be generated using a bit-mapped OSD engine. The OSD images may be stored in a memory where a memory interface may be used to fetch various bit-mapped pre-stored objects in the memory and place them on the canvas which may also be stored in the memory. The memory interface may also perform format conversions while fetching the requested object. The bit-mapped OSD engine may read the stored canvas in a raster scan order and send it to the overlay. Additional video channel signals 2040 may include a cursor OSD plane which may be generated by a cursor OSD engine and may use a small on-chip memory to store the bit map of a small object like a cursor, an external OSD plane which is received from an external source. The external OSD engine may send out the raster control signals and the display clock. The external OSD source may use these control signals as a reference and send data in the scan order. This data may be routed to the overlay. If an external OSD plane is enabled, any Flexiport may be used to receive the external OSD data.

Overlay 1940 before CMU 1930 may overlay first video channel stream 1653 and second video channel stream 1655. Overlay 1940 may enable CMU 1930 to perform more efficiently by allowing the CMU 1930 to operate on a single video stream thereby obviating the need to replicate modules within CMU 1930 for multiple video channel streams. Overlay 1940 in addition to providing a single video channel signal 1942 to CMU 1930 may also provide a portion (i.e., pixel-by-pixel) indicator 1944 to CMU 1930 that identifies the video portion as either belonging to the first video channel stream or the second video channel stream.

Two sets of programmable parameters 2020 and 2030 that correspond to first video channel stream 1653 and second video channel stream 1655 may be provided. Selector 2010 may use portion indicator 1944 to select which programmable parameters to provide to CMU 1930. For example, if portion indicator 1944 indicates that the portion processed by CMU 1930 belongs to first video channel stream 1653, selector 2010 may provide to CMU 1930 programmable parameters 2020 that correspond to first video channel stream 1653.

There may be the same number of layers as the number of video planes. Layer 0 may be the bottom most layer and the subsequent layers may have an increasing layer index. The layers may not have dimensional or positional characteristics but instead may provide an order in which they should be stacked. Overlay engine 2000 may mix the layers beginning with layer 0 and moving upwards. Layer 1 may be first blended with layer 0 using a blend factor associated with the video plane put on layer 1. The output of layer 0 and layer 1 blending may then be blended with layer 2. The blend factor that may be used may be the one associated with the plane put on layer 2. The output of the layer 0, layer 1, and layer 2 blending may then be blended with layer 3 and so on until the final layer is mixed. It should be understood that one of ordinary skill may choose to blend the layers in any combination without departing from the teachings of this invention. For example, layer 1 may be blended with layer 3 and then with layer 2.

It should also be understood that although overlay engine 2000 is described in connection with the primary output channel, color processing and channel blending pipeline 560 may be modified to provide an M-plane overlay using overlay engine 2000 on auxiliary output channel.

Figure 22:
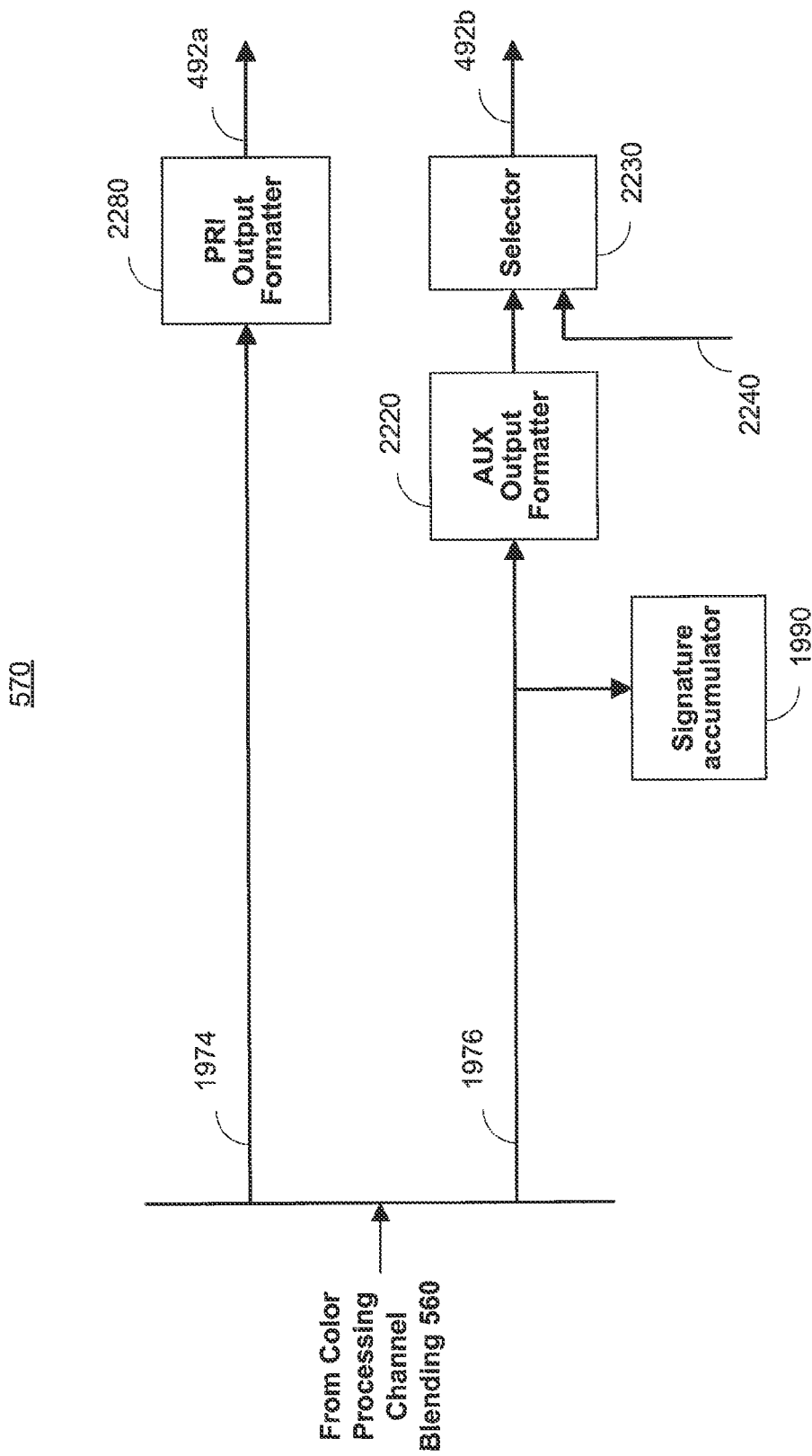
FIG. 22 is a detailed illustration of the back end video pipeline of the dual video processor in accordance with principles of the present invention.

FIG. 22 illustrates in more detail back end pipeline stage 570 of the video pipeline. Back end pipeline stage 570 may include at least a primary output formatter 2280, a signature accumulator 1990, an auxiliary output formatter 2220 and a selector 2230.

Back end pipeline stage 570 may perform output formatting for both primary and auxiliary outputs and may generate control outputs (Hsync, Vsync, Field) as the auxiliary output. The back end pipeline stage 570 may facilitate both digital and analog interfaces. Primary output formatter 2280 may receive processed primary video channel signals 1974 and generate a corresponding primary output signal 492*a*. Auxiliary output formatter 2220 may receive processed auxiliary video channel signals 1976 and generate a corresponding auxiliary output signal 492*b*. Signature accumulator 1990 may receive auxiliary video channel signals 1976 and accumulate and compare the differences between the accumulated signals to determine the video signal quality of the output video signal and may provide this information to a processor to change system parameters if necessary.

Auxiliary video channel signals 1976 may also be provided to a CCIR656 encoder (not shown) prior to being formatted for output 492*b*. The CCIR656 encoder may perform any necessary encoding to place the signal in condition for external storage or some other suitable means. Alternatively auxiliary video channel signals 1976 may be provided as output signal 492*b* without being encoded or formatted by using selector 2230 to select bypass auxiliary video channel signal 2240.

An interlacing module (not shown) in back end pipeline stage 570 may also be provided. If an input signal is interlaced, it may first be converted to progressive by de-interlacer 340 (FIG. 13). The de-interlacer may be necessary because all the subsequent modules in the video pipeline stages may work in the progressive domain. The interlacer in back end pipeline stage 570 may be selectively turned on if an interlaced output is desired.

The interlacer module may include at least a memory large enough to store at least two lines of pixels but may be modified to store an entire frame if necessary. The progressive input may be written to the memory with the progressive timings. The interlaced timings in lock with the progressive timings may be generated at half the pixel rate. The data may be read from the memory with the interlaced timings. Even field lines may be dropped in odd fields and odd field lines may be dropped in even fields. This in turn may produce an interlaced output that is suitable for use with a given device.

Thus it is seen that apparatus and methods for providing multiple high-quality video channel streams using shared storage are provided. A person skilled in the art will appreciate that the present invention can be practiced by other than the described embodiments, which are presented for purposes of illustration rather than of limitation, and the present invention is limited only by the claims which follow.

What is claimed is:

1. A video processing system comprising:
   a first plurality of line buffers configured to provide a first set of buffered field lines from an input video field;
   a second plurality of line buffers configured to provide a second set of buffered field lines from a twice-delayed noise reduced video field; and
   a noise reducer configured to:
   receive field lines of the input video field, field lines of the twice-delayed noise reduced video field, the first set of buffered field lines, and the second set of buffered field lines; and
   output a noise reduced video field.

2. The video processing system of claim 1 further comprising:
   a first field buffer configured to receive the noise reduced video field and to provide a once-delayed noise reduced video field; and
   a second field buffer configured to receive the once-delayed noise reduced video field and to provide the twice-delayed noise reduced video field.

3. The video processing system of claim 2, wherein the first plurality of line buffers comprises:
   a first line buffer configured to receive a field line of the input video field and to provide a first buffered field line; and
   a second line buffer configured to receive the first buffered field line and to provide a second buffered field line;
   wherein the first set of buffered field lines comprises the first buffered field line and the second buffered field line.

4. The video processing system of claim 3, wherein the second plurality of line buffers comprises:
a third line buffer configured to receive a field line of the twice-delayed noise reduced video field and to provide a third buffered field line; and
a fourth line buffer configured to receive the third buffered field line and to provide a fourth buffered field line;
wherein the second set of buffered field lines comprises the third buffered field line and the fourth buffered field line.

5. The video processing system of claim 2 further comprising:
a deinterlacer configured to:
receive field lines of the input video field, field lines of the once-delayed noise reduced video field, and the second set of buffered field lines; and
output a de-interlaced video signal.

6. The video processing system of claim 2 further comprising:
a deinterlacer configured to:
receive field lines of the noise reduced video field, field lines of the once-delayed noise reduced video field, and the second set of buffered field lines; and
output a de-interlaced video signal.

7. The video processing system of claim 6 further comprising:
a third plurality of line buffers configured to provide a third set of buffered field lines from the noise reduced video field; and
a fourth plurality of line buffers configured to provide a fourth set of buffered field lines from the once-delayed noise reduced video field;
wherein the deinterlacer is further configured to receive the third set of buffered field lines and the fourth set of buffered field lines.

8. The video processing system of claim 7, wherein the first set of buffered field lines comprises at least two buffered field lines, the second set of buffered field lines comprises at least three buffered field lines, the third set of buffered field lines comprises at least two buffered field lines, and the fourth set of buffered field lines comprises at least three buffered field lines.

9. The video processing system of claim 6, wherein the noise reducer and deinterlacer are configured to share the second plurality of line buffers.

10. A method of operating a video processing system, the method comprising:
processing field lines of an input video field, field lines of a twice-delayed noise reduced video field, a first set of buffered field lines, and a second set of buffered field lines to produce a noise reduced video field;
wherein the first set of buffered field lines comprises buffered field lines from the input video field; and
wherein the second set of buffered field lines comprises buffered field lines from the twice-delayed noise reduced video field.

11. The method of claim 10 further comprising:
storing the noise reduced video field in a first field buffer;
moving a once-delayed noise reduced video field from the first field buffer to the second field buffer; and
receiving the twice-delayed noise reduced video field from the second field buffer.

12. The method of claim 11 further comprising:
storing a field line of the input video field in a first line buffer; and
moving a previously buffered field line from the first line buffer to a second line buffer.

13. The method of claim 12 further comprising:
storing a field line of the twice-delayed noise reduced video field in a third line buffer; and
moving a previously buffered field line from the third line buffer to a fourth line buffer.

14. The method of claim 11 further comprising:
processing field lines of the input video field, field lines of the once-delayed noise reduced video field, and the second set of buffered field lines to produce a de-interlaced video signal.

15. The method of claim 11 further comprising:
processing field lines of the noise reduced video field, field lines of the once-delayed noise reduced video field, and the second set of buffered field lines to produce a de-interlaced video signal.

16. The method of claim 11 further comprising:
processing field lines of the noise reduced video field, field lines of the once-delayed noise reduced video field, the second set of buffered field lines, a third set of buffered field lines, and a fourth set of buffered field lines to produce a de-interlaced video signal;
wherein the third set of buffered field lines comprises buffered field lines from the noise reduced video field; and
wherein the fourth set of buffered field lines comprises buffered field lines from the once-delayed noise reduced video field.

17. The method of claim 16, wherein the first set of buffered field lines comprises at least two buffered field lines, the second set of buffered field lines comprises at least three buffered field lines, the third set of buffered field lines comprises at least two buffered field lines, and the fourth set of buffered field lines comprises at least three buffered field lines.

18. The method of claim 16, wherein the noise reduced video field is produced by a noise reducer and the de-interlaced video signal is produced by a de-interlacer.

19. The method of claim 18, wherein the first set of buffered field lines are stored in a first plurality of line buffers, the second set of buffered field lines are stored in a second plurality of line buffers, the third set of buffered field lines are stored in a third plurality of line buffers, and the fourth set of buffered field lines are stored in a fourth plurality of line buffers.

20. The method of claim 19, wherein the noise reducer and deinterlacer are configured to share the second plurality of line buffers.

* * * * *